US005644096A

United States Patent [19]

Bull

[11] Patent Number: 5,644,096

[45] Date of Patent: Jul. 1, 1997

[54] MUSICAL COMPUTATIONAL DEVICES

[76] Inventor: Gerard Neil Bull, 3/33 Kea Street, Katikati, 3063, New Zealand

[21] Appl. No.: 436,296

[22] PCT Filed: Nov. 11, 1993

[86] PCT No.: PCT/NZ93/00109

§ 371 Date: Jun. 26, 1995

§ 102(e) Date: Jun. 26, 1995

[87] PCT Pub. No.: WO94/11857

PCT Pub. Date: May 26, 1994

[30] Foreign Application Priority Data

Nov. 11, 1992 [NZ] New Zealand .......................... 245096

[51] Int. Cl.[6] .................................................. G09B 15/00

[52] U.S. Cl. .................... 84/485 SR; 84/473; 84/471 SR

[58] Field of Search ............................... 84/473, 471 SR, 84/477 R, 478, 485 R, 485 SR

[56] References Cited

U.S. PATENT DOCUMENTS

| | | | |
|---|---|---|---|
| 3,668,967 | 6/1972 | Malis | 84/471 |
| 3,728,931 | 4/1973 | Leonard | 84/471 |
| 3,867,866 | 2/1975 | Adams | 84/473 |
| 5,029,507 | 7/1991 | Bezeau, Jr. | 84/485 SR |

FOREIGN PATENT DOCUMENTS

| | | | |
|---|---|---|---|
| 0029463 | 6/1981 | European Pat. Off. | G09B 15/02 |
| 0243036 | 10/1987 | European Pat. Off. | G10G 1/02 |
| 82853/75 | 1/1977 | WIPO | G10G 1/04 |
| WO84/01845 | 10/1984 | WIPO | G09B 15/02 |
| WO84/04192 | 10/1984 | WIPO | G09B 15/02 |
| WO92/02011 | 2/1992 | WIPO | G10G 1/02 |

*Primary Examiner*—Michael L. Gellner
*Assistant Examiner*—Shih-yung Hsieh
*Attorney, Agent, or Firm*—Baker, Maxham, Jester & Meador

[57] ABSTRACT

Disclosed is apparatus comprising at least two elements whose positions relative to each other are alterable, and in which at least a portion of each element is visible during use of the apparatus, and wherein a first of said elements exhibits an indicated sequence, and a second of said elements exhibits at least one of a group of musical representations comprising:

an alphabetic representation of musical notes;

a representation of a keyboard;

a representation of finger positions on an instrument;

an accepted musical notation;

and wherein the relative positions of said first and second elements may be altered so that correlating said indicated sequence with a said musical representation indicates at least one of a scale or chord. Various embodiments of apparatus may be used in determining scales, and variations and modes thereof, find use in creating and determining chords, find use in key transposition and/or determining fingering on keyboards and frets.

14 Claims, 16 Drawing Sheets

BASIC CHORDS

THE NUMBERS IN THE CIRCLES ARE THE CHORD FORMULA NUMBERS RELATING TO THE TONIC OF THE INDIVIDUAL CHORD

"OTHER CHORDS SHOWN IN A" CHART (o) = Optional Note If the chord shape is moved up the neck one fret from A Δ 7 to A♯Δ7 for example the optional note is not played

MUSICAL COMPUTATIONAL DEVICES

TECHNICAL FIELD

This invention relates to improvements in and relating to musical computational devices. Various embodiments include means for indicating the fingering position of musical notes on a fret, keyboard or other instrument, and may facilitate chord selection and creation. Some embodiments may include a sequence to indicate various scales and modes thereof, and again may assist in the selection and creation of various chords. Some embodiments may also provide key transposition functions.

BACKGROUND ART

Many stringed instruments, such as the guitar, rely upon the positioning of fingers upon the frets to enable a particular note to be played. However, positioning fingers upon successive frets along a string does not play a major scale but instead would be the equivalent of playing successive keys on a keyboard, for example, C C♯/D♭ D♯/E♭ E F etc.

Furthermore, while the sequence is the same for all strings, the position of corresponding notes on adjacent strings do not lie on the same fret. Consequently, part of the skill in playing a stringed instrument such as the guitar is remembering the position of fingers on frets corresponding to the notes. This can be difficult for beginners and the problem is compounded when chords, comprising several notes, must be played.

As a musician progresses, it may also be desirable to perform musical pieces in other than a major scale (e.g., melodic minor, harmonic minor, pentatonic, diminished, etc.) and in the various modes thereof (e.g., Dorian, phrygian, lydian, mixolydian, aeolian and locrian). Determining these scales, let alone the finger positioning, can be difficult for any musical instrument and can result in considerable effort by the musician.

It is also common practice to transpose the key of musical pieces. Similarly, the process of transposing a piece of music into another key can be tedious and for stringed instruments such as the guitar, different fingering must also be learned. The problems also arise for other instruments in which the position of the fingers affect the note being played.

To date, the applicant is not aware of any apparatus or devices which can simplify the task of indicating finger positioning, determining various scales and chords and variations thereof, transposing keys or various musical computations. Typically, to perform these functions a person must manually calculate the required operations, much in the same manner as a person performing mathematical sums with a pen and paper—there is no musical abacus or slide rule to aid the musician. Further, due to the relationship between musical notes, their sequence and relationship does not make them analogous to normal mathematical relationships. Furthermore, the desired functions (such as key transposition) do not have a direct analogy in normal base-10 mathematical operations.

It is an object of the present invention to address the foregoing problems and to provide an apparatus which can aid the musician, or at least to provide the public with a useful choice.

Further aspects and advantages of the present invention will become apparent from the ensuing description which is given by way of example only.

DISCLOSURE OF INVENTION

According to one aspect of the present invention, there is provided apparatus comprising at least two elements whose positions relative to each other are alterable, and in which at least a portion of each element is visible during use of the apparatus, and wherein a first of said elements exhibits an indicated sequence, and a second of said elements exhibits at least one of a group of musical representations comprising:

an alphabetic representation of musical notes;

a representation of a keyboard;

a representation of finger positions on an instrument;

an accepted musical notation;

and wherein the relative positions of said first and second elements may be altered so that correlating said indicated sequence with a said musical representation indicates at least one of a scale or chord.

According to another aspect of the present invention, there is provided apparatus substantially as described above wherein a said indicated scale or chord comprises at least one of a preferred group of keys comprising: a major key, a minor key, and including the Dorian, phrygian, lydian, mixolydian, aeolian, and locrian modes, and including melodic, harmonised and diminished variations.

According to a further aspect of the present invention, there is provided a method for determining the transposition of a musical key comprising the use of apparatus comprising at least two elements movable with respect to each other, and wherein at least one element comprises an indicated sequence and the other element exhibits scale information representative of the musical notes of a scale, and wherein a beginning or reference point in said indicated sequence is aligned with said scale information, the relative position of the aligned indicated sequence and scale information indicating the correct note for the key transposition.

According to yet a further aspect of the present invention, there is provided a method for determining the relative finger positions for scales and chords on an instrument comprising the use of apparatus comprising at least two elements movable with respect to each other, and wherein at least one element comprises an indicated sequence and the other element exhibits instrument information representative of the note determining elements of said instrument, and wherein the elements may be aligned so that a beginning or reference point of said indicated sequence is aligned with a user-selected position of said instrument information and wherein said indicated sequence indicates the finger positions to complete a scale or chord starting at the user selected position.

The term guitar where used herein, and unless otherwise specified, shall be used in its broadest sense and shall refer to any member of the guitar family. Typically this shall be construed as meaning any stringed instruments whereby the note generated by a string dependent upon the positioning of a finger or stop therealong. It should also be noted that while early embodiments of the present invention was developed with primarily the needs of a guitar player in mind, it may also find application for any musician regardless, of the instrument which they play. It will also be of use to music composers.

The present invention generally comprises at least two elements which are movable or slidable with respect to one another. In most instances the portions may be slidable linearly though this does not preclude other embodiments from also being constructed, just as there are circular embodiments of the mathematical slide rule also available. It may perhaps be more appropriate to say that at a particular point of interest on the device, it appears that the portions slide substantially linearly with respect to each other, even though the device as a whole may be constructed so that a point on the portions when monitored over a greater distance actually travels through an arc.

In most embodiments, the elements will be arranged so that one element either fully or partially overlies the other. Once again, this does not preclude other arrangements such as side by side element as in the mathematical slide rule. However, typically a greater amount of information can be simultaneously presented on elements where one overlies the other and several information windows are provided.

Where there are overlying elements, it is desirable that at least the overlying element is substantially transparent, in the area of interest, or otherwise constructed so that the information presented by the overlaid element can be seen. While various options are possible, a preferred embodiment provides a window on the overlying element enabling information on the overlaid element to be seen.

The information presented by the device may vary according to need. For instance, the information required by a guitar player may be different to that required by a music composer. Alternatively the information required may be similar but the presentation of this information may be altered to be more useful to the targeted user.

As an example, a preferred embodiment has on at least one element (it does not matter whether this is the upper or lower element as typically both elements will be visible in the area of interest) information signifying the accepted musical notes. This may be complete or partial depending on the need.

On the other element is information denoting a series indicating a logical succession to be followed. When this information is overlaid on the aforementioned musical notes, a scale or succession of notes is indicated. According to the information being presented this may, for example, be a major, minor, diminished, pentatonic or other scale.

Furthermore, in the preferred embodiment, by positioning a starting point in the sequence over a particular note, a particular scale is played. By repositioning the starting point over another musical note, a similar scale will be played but in a different key. That is to say, both scales played will be the same (e.g., major, minor, diminished or whatever has been chosen) but in a different key. However, this may not be the case in alternative embodiments, in which the information may be adjusted accordingly.

Generally, for apparatus comprising at least two elements, a first of said elements will generally exhibit an indicated sequence. The indicated sequence may comprise at least one of the following forms of representation: a numerical sequence (including Roman, Arabic and other numeric notations), an alphabetic sequence, and a sequence of musical notes (this may be alphabetically represented or in musical notation). A second of said elements of the apparatus will generally exhibit at least one of a group of musical representations comprising:

an alphabetic representation of musical notes;

a representation of a key board (of an instrument);

a representation of finger positions on an instrument;

an accepted musical notation.

Furthermore, the arrangement will generally be such that the relative positions of said first and second elements may be altered so that correlating the aforesaid indicated sequence with an aforesaid musical representation indicates at least a scale or a chord or both.

Generally, to use such a device for determining the transposition of a musical key, a beginning or reference point within said indicated sequence is aligned (by relative movement of the element) with scale information (which comprises at least one of the aforesaid group of musical representations) sufficient to indicate at least a complete scale. Typically, the beginning or reference point is aligned with information on the other element representative of the note of the key into which the transposition is to occur. For instance, and by way of example only, the indicated sequence may comprise an alphabetic representation of the standard musical notes, or a repetition thereof (e.g., C, C♯/D♭, D, D♯/E♭, E, F, F♯/G♭, G, G♯/A♭, A, A♯/B♭, B, C . . . ). Preferably, the other element will comprise a musical representation which also includes the foregoing; sequence. In some embodiments either or both of the sequence and representation may be represented in an alternative form (such as a key board, musical notation, etc.).

By aligning a beginning point of the indicated sequence (which in the foregoing example would be a note representing the current key of the music to be transposed) is aligned with a note representing the key into which the music is to be transposed. For instance, if the music is in the key of G and needs to be converted into A♭, then the elements are moved so that G is aligned with A♭. The sequence whose reference point has been arbitrarily designated G in this example, represents the notes of the music being transposed. By matching the information on the second element to these notes, the new note for in the key of A♭ can be determined. This example will become clearer from the drawings and examples discussed later herein.

In the preceding arrangement, it is noted that there is a substantially linear arrangement between the two scales and it will be noted from drawings that segments of substantially identical width, each segment representing a specific note, are provided on each scale.

Many different ways may be used to represent the information on the elements. For instance, in a preferred embodiment, the positioning of fingers or stops on the frets is also indicated enabling the guitarist to readily come to terms with the fret positions. Finger positions on other musical instruments may be illustrated in some embodiments of the present invention.

Further information may also be provided by the computational device. For instance, in the preferred embodiment to be described later, the various modes of a scale are also identifiable. In a preferred embodiment, different starting points on the succession represent the starting points for the different modes of a scale. This will be apparent from the examples to be given later.

The scales and modes indicated are largely a matter of user choice. In a simple embodiment, where it is not desirable to present too much information for ease of use, it may be desirable to give information relating only to the major, and perhaps to the minor scales. In some embodiments, multiple windows or areas within a window, may be provided to indicate various sets of information.

In another embodiment, additional windows or areas may be used to provide other useful music calculations. For instance, the transposer may be provided to enable the transposition of music from one key to another. In a preferred embodiment, this may comprise aligning the note of the existing key with the note corresponding to the new key. A sequence on the portion representing the original key will indicate the new note positions. This becomes clearer from the illustrated embodiment to be described later though it is also noted that variations of this example may also be used.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Example 1

Figure 1:
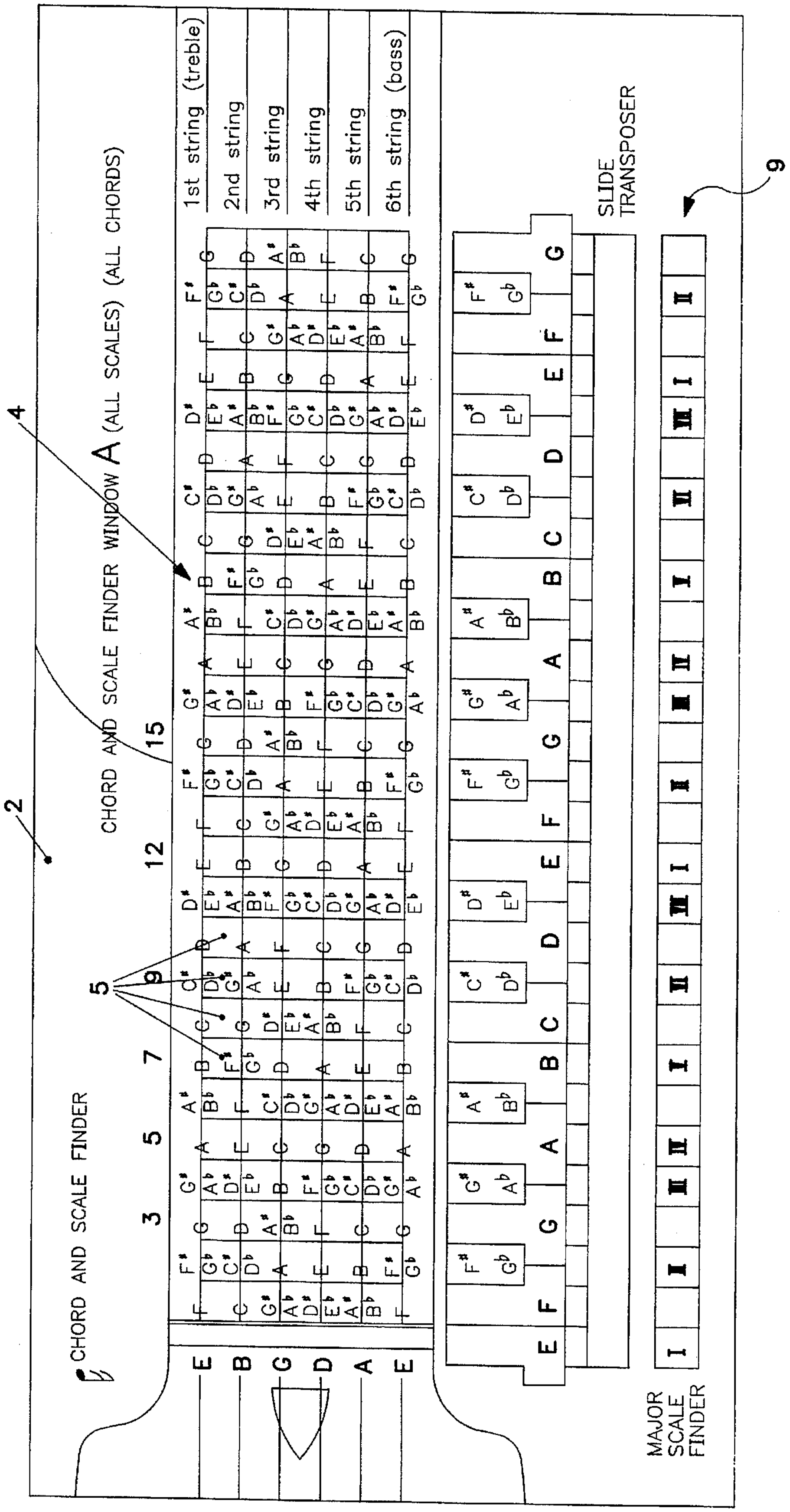
FIG. 1: is a plan view of the sleeve, comprising the overlying portion, according to one preferred embodiment of the present invention.

With reference to the drawings and by way of example only there is provided a computational device, generally indicated by arrow 1 having at least two elements 2, 3 slidable with respect to each other, one element 2 overlying the other 3, said overlying element 2 being substantially transparent in at least one region 4 where it overlies the other 3, one of said elements being divided into areas 5 representing distinct musical notes and/or the frets of a guitar, the upper portion 3 comprising markings 6 indicating at least one sequence which corresponds with the other element (2, 5) to indicate the notes of a scale and/or the frets corresponding to the scale on a guitar.

FIG. 1 illustrates a sleeve 2 which represents the overlying element—in other embodiments an element may not comprise a sleeve but rather a guide in which a second element can move. Other variations are possible.

A central portion 4 comprises a transparent window. Overprinted on this area is a grid of squares 5 in which the vertical lines roughly correspond to the frets of a guitar and the horizontal lines represent the strings. These squares 5 are also useful for delineating the areas assigned to each musical note.

For the convenience of the user, the notes corresponding to each area have been indicated on the window 4. However on other embodiments, less than this amount, or even greater, detail may be provided. The arrangement of the letters may also vary for differing instruments. In addition, only a single row need be provided in simple embodiments of the present invention and such an embodiment would be useful for keyboard use.

Figure 2:
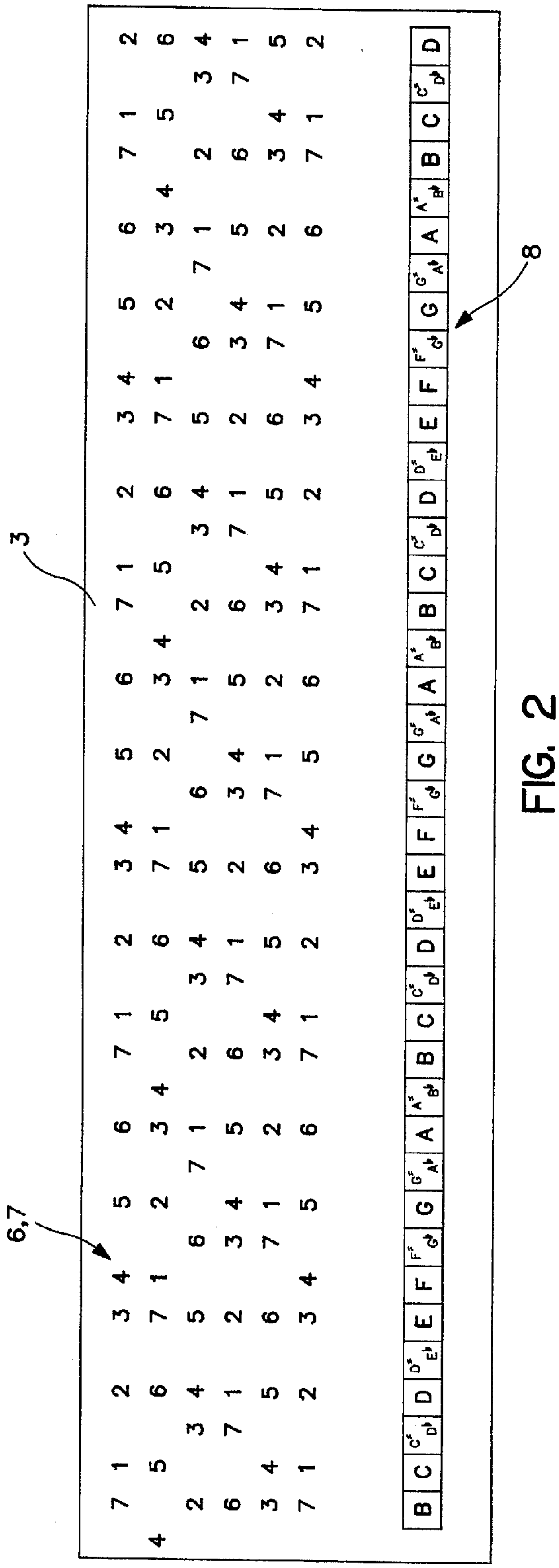
FIG. 2: is a plan view of the sliding insert, comprising the overlaid portion, of preferred embodiment of the present invention.

The insert 3 is illustrated in FIG. 2. This incorporates a central section 7 having sequences of numbers which will correspond with the assigned positions of the notes on the sleeve 2. By following the numbered sequence, various scales may be followed. Sequences other than numbers may also be provided and the printed information may be in a contrasting or highlighted colour with respect to the printing on the sleeve 2.

Figure 3:
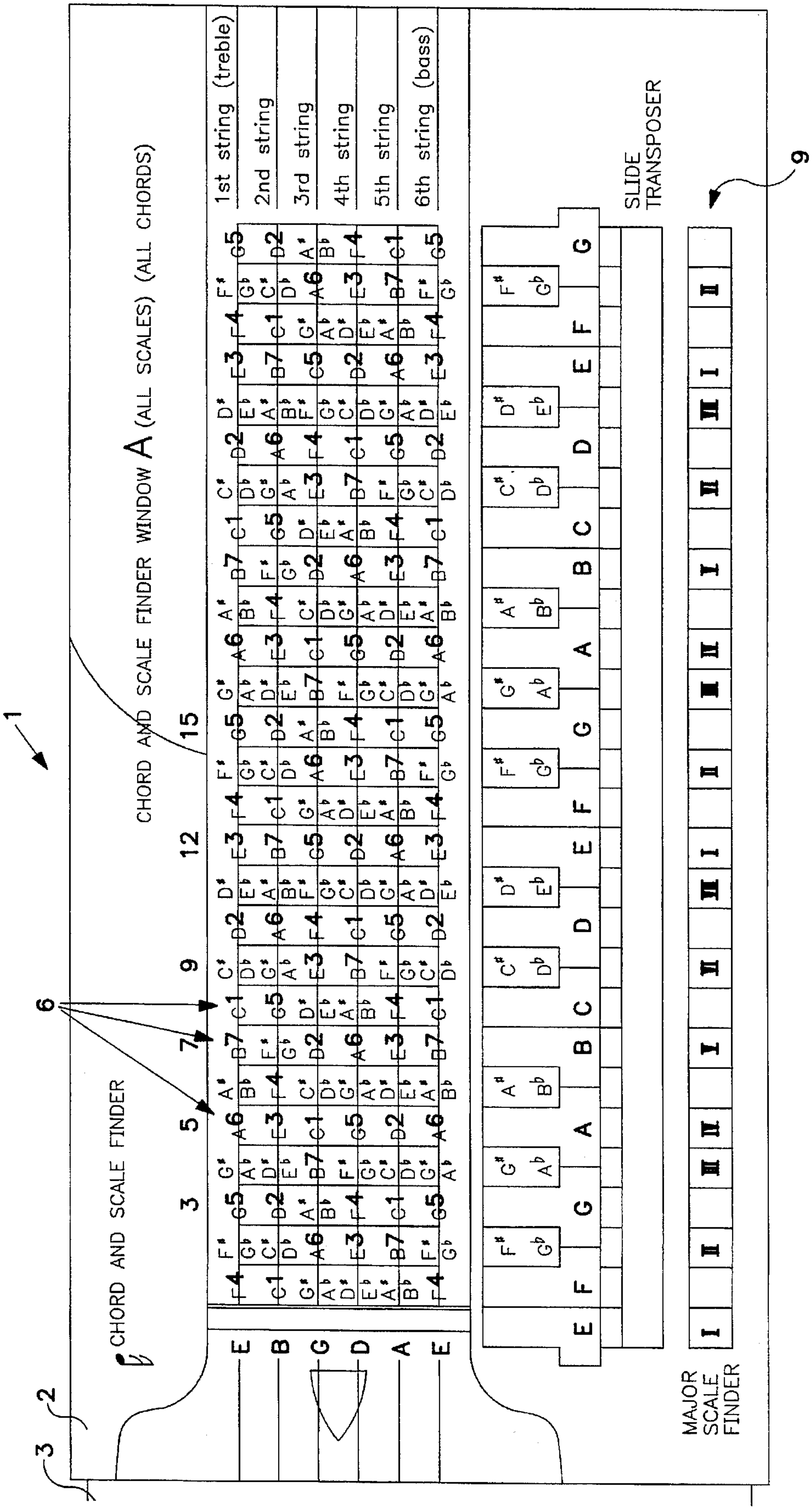
FIG. 3: is a plan view of the sleeve of FIG. 1 overlying the insert of FIG. 2, in an arbitrarily chosen position.

As an example of use, and it should be noted that the embodiments of FIGS. 1–3 represent major scales, the numeral '1' of the insert 3 is aligned with the musical note representing the key of interest. For instance, if we wished to ascertain the notes corresponding to the major scale of C we would position the numeral '1' in a position corresponding to the note of C. This is apparent in FIG. 3. By following the sequence 1, 2, 3 . . . the notes corresponding to the scale of C are readily identified. In addition, the fret positions on the neck of the guitar are also indicated, as can be seen in FIG. 3.

The information provided thus also indicates the positions on various strings corresponding to the notes. Therefore if a musician did not wish to play a scale on one string, he could readily skip across to another string and tell at a glance from the device where the correct finger position would be. This has a potential to aid musicians in improvisation and performing riffs.

As can be appreciated, much of the information displayed is repeated from string to string and is merely translated left or right according to the appropriate position on that string. Where fret positioning is not required, a single row would provide most of the necessary information for a musician. The length of the row may be shortened or extended as well.

To determine the various modes of a scale, Table 1 may be consulted. This will indicate the number (in the sequence) of the insert 3 which should be positioned over the note representing the key desired. For instance, for the Dorian mode of the scale of C, the numeral 2 would be aligned to be positioned in the area denoting the note of C, i.e., in the position which the numeral 1 occupied in the example given above. The numeric sequence indicated in table 1 is then played i.e. 2, 3, 4, 5, 6, 7, 1, 2. That would then indicate the notes for the Dorian mode of the scale of C major.

As another examples, if the mixolydian mode was to be ascertained, then the number 5 would be aligned with C. The sequence 5, 6, 7, 1, 2, 3, 4, 5 would then indicate the notes corresponding to the mixolydian mode of the scale of C major. If the phrygian mode of the scale A♭, is required then the numeral 3 is aligned with the square indicating G♯/A♭, and the sequence 3, 4, 5, 6, 7, 1, 2, 3 indicates the notes in that scale.

Figure 4:
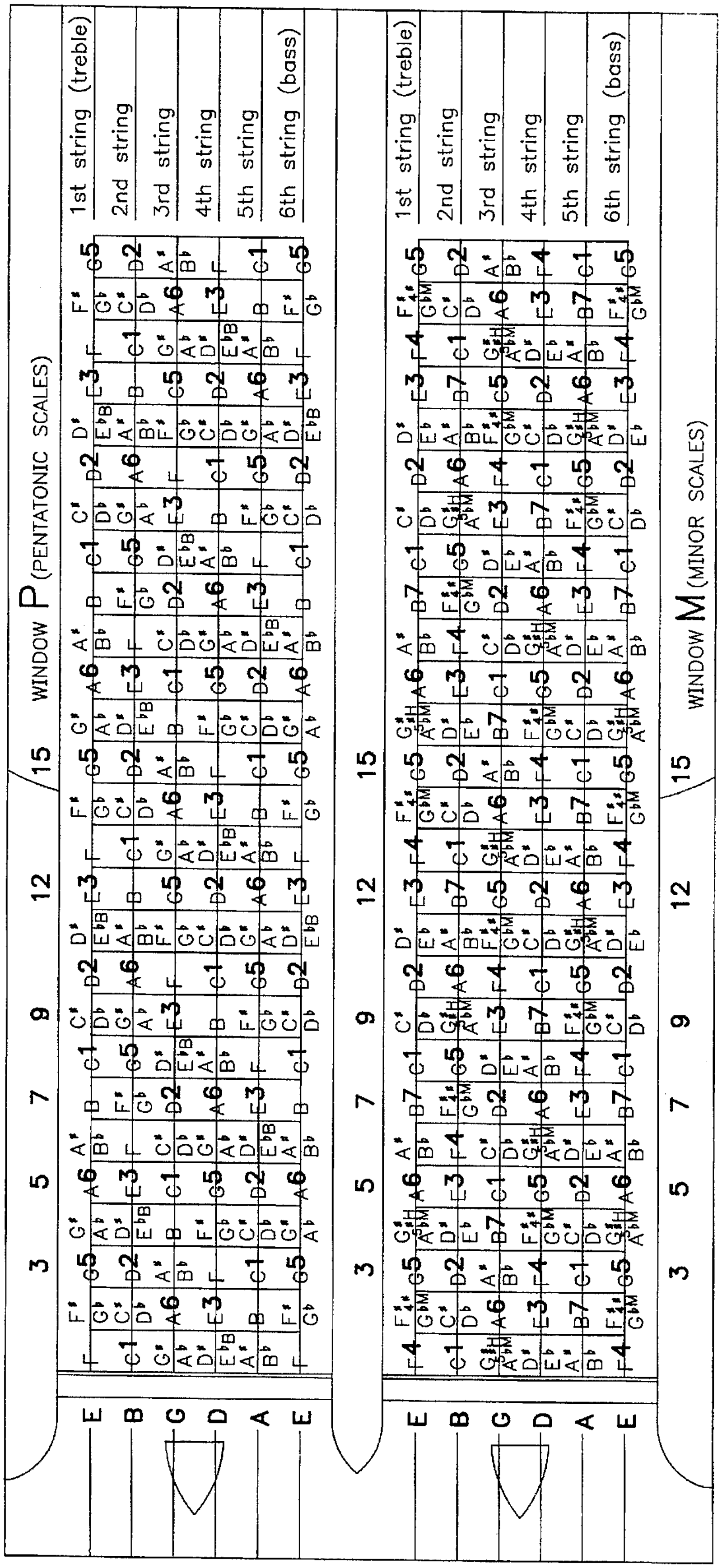
FIG. 4: is an alternative embodiment illustrating minor and pentatonic scales.
Figure 5:
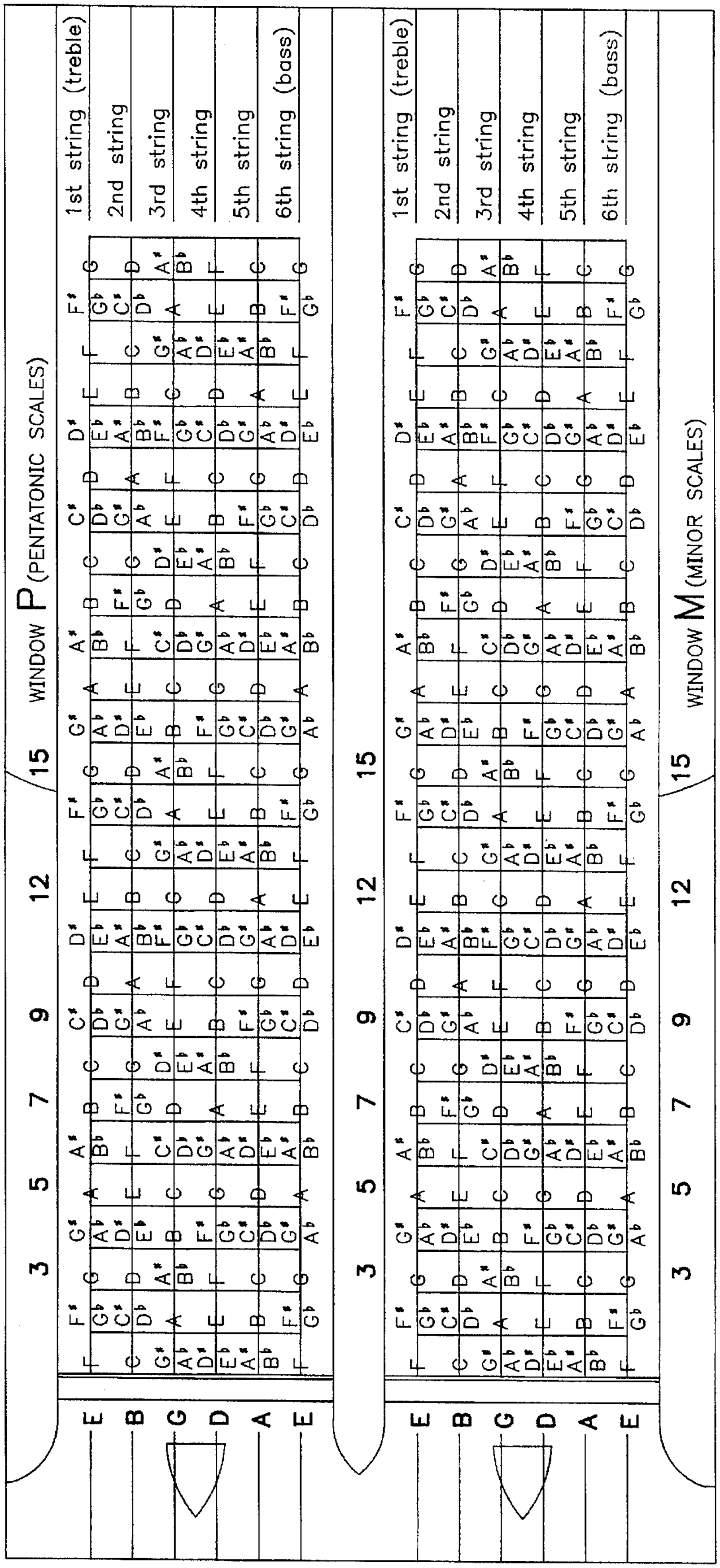
FIG. 5: is a sleeve for the embodiment of FIG. 4.
Figure 6:
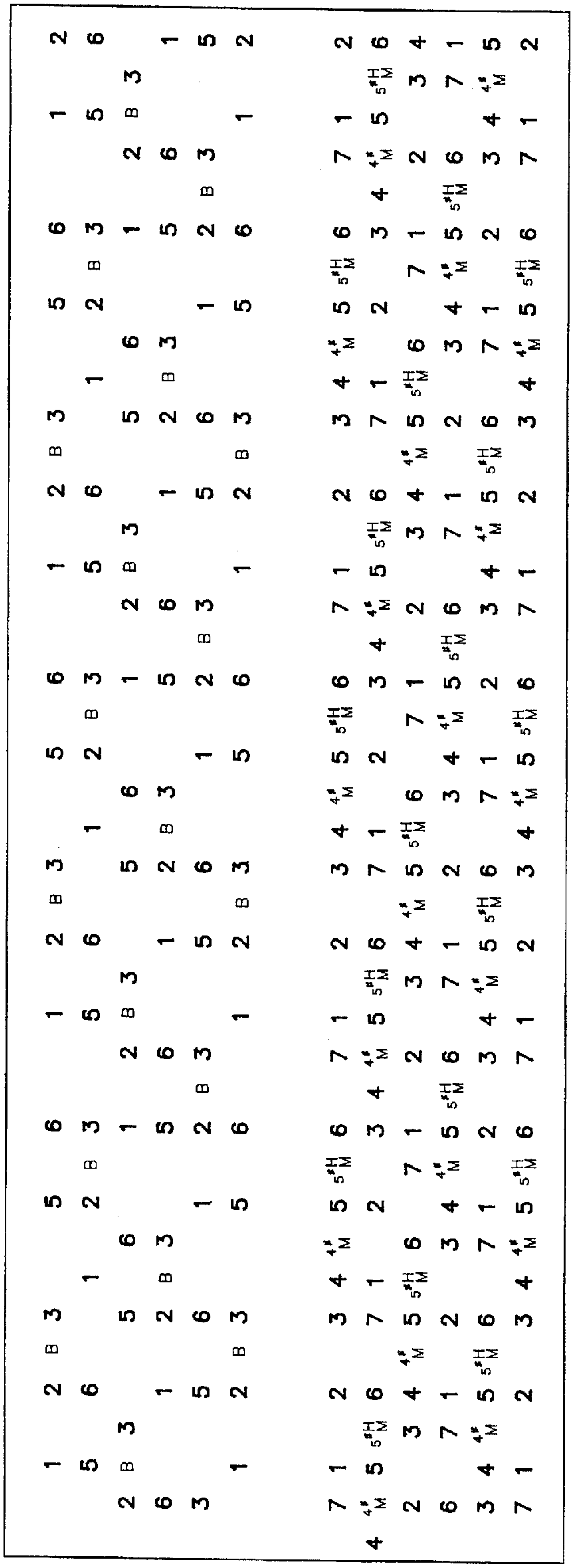
FIG. 6: is the insert for the embodiment of FIG. 4.

FIGS. 4 through 6 illustrate alternative scales and in particular the pentatonic and mirror scales. Further arrangements for the diminished and other scales may also be provided but these have not been illustrated here. It is assumed that in light of the description given herein, a skilled addressee of the art would be able to construct a device capable of displaying these scales.

In a preferred embodiment of the present invention, such additional and alternative scales (e.g., as illustrated in FIGS. 4–6) may be provided on the rear of the device.

If the sequences for alternative scales are known, then the embodiment of FIGS. 1 through 3 may be readily determined from the embodiment of FIGS. 1 through 3. For instance, the diminished scale is represented by the following sequence:

1, 2, ♭3, 4, ♭5, ♯5, 6, 7, 1.

Figure 7:
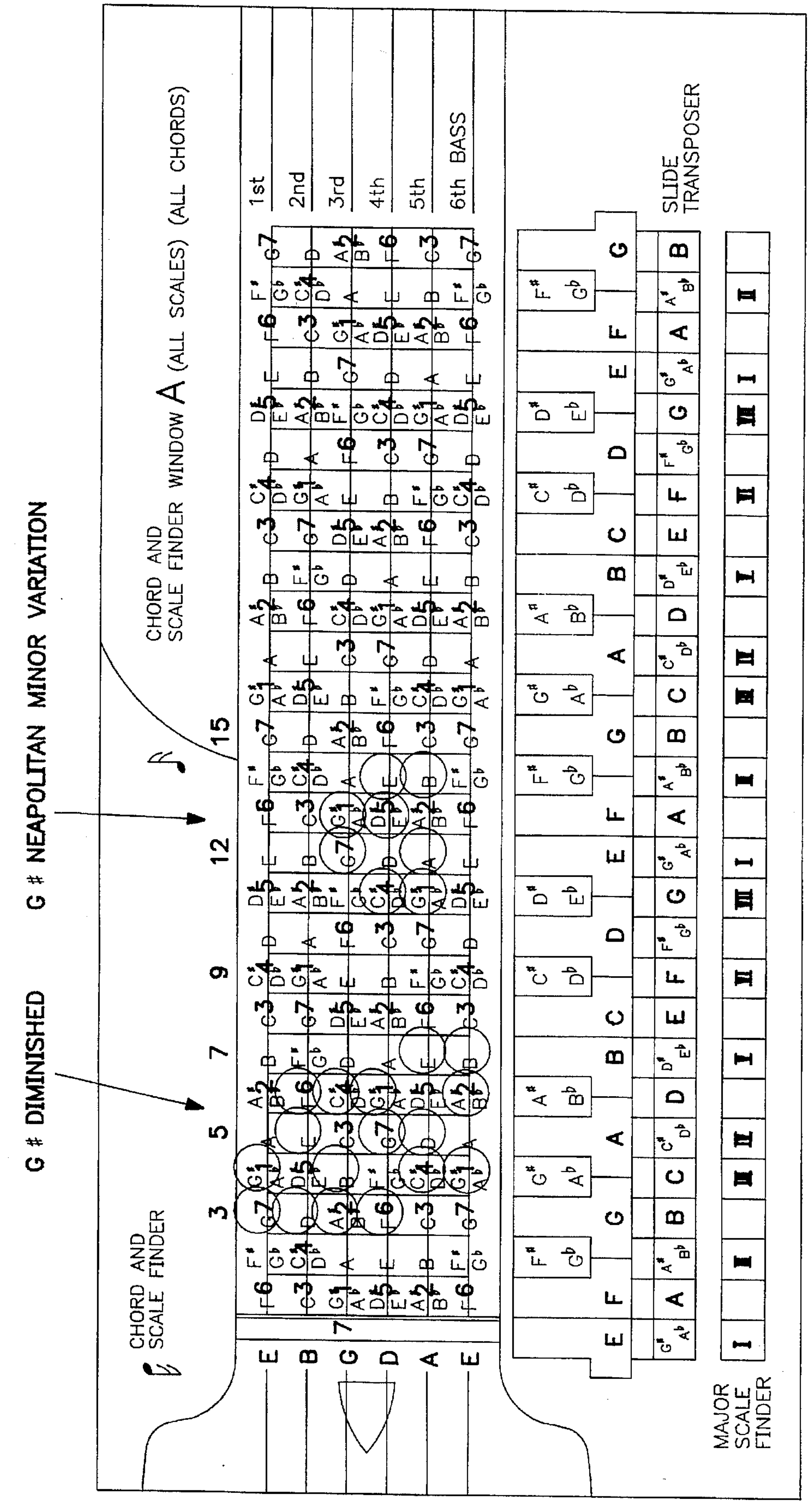
FIG. 7: is a view of the embodiment of FIGS. 1 and 2 with the sequence for the: two scales indicated.

If for instance we wish to determine the diminished scale in the key of G♯, the numeral '1' is positioned to be aligned with the G♯/A♭ mark and the above numerical sequence followed. By way of example, FIG. 7 illustrates the G♯ diminished scale over two octaves. This is represented by the left-hand cluster of circles. It is noted, in the illustrated embodiment of FIG. 7, for clarity the flat and sharp numerical positions (e.g., ♭3, ♯5) have not been shown. Thus all of the blank spaces not represented by a number correspond to a flat/sharp position. Other embodiments may provide this information on the device.

TABLE 1

| SCALE | | | | | | | | |
|---|---|---|---|---|---|---|---|---|
| MAJOR SCALE (IONION;) MODE | 1 | 2 | 3 | 4 | 5 | 6 | 7 | 1 |
| MODES GENERATED BY THE MAJOR SCALE: | | | | | | | | |
| DORIAN MODE | 2 | 3 | 4 | 5 | 6 | 7 | 1 | 2 |
| PHRYGIAN | 3 | 4 | 5 | 6 | 7 | 1 | 2 | 3 |
| LYDIAN | 4 | 5 | 6 | 7 | 1 | 2 | 3 | 4 |
| MIXOLYDIAN | 5 | 6 | 7 | 1 | 2 | 3 | 4 | 5 |
| AEOLIAN (NATURAL) MINOR | 6 | 7 | 1 | 2 | 3 | 4 | 5 | 6 |
| LOCRIAN | 7 | 1 | 2 | 3 | 4 | 5 | 6 | 7 |
| MINOR SCALES: | | | | | | | | |
| THE NATURAL MINOR SCALE IS THE SAME AS THE AEOLIAN MODE BUT CAN ALSO BE PLAYED USING THE No's:- | 1 | 2 | ♭3 | 4 | 5 | ♭6 | ♭7 | 1 |
| MELODIC MINOR | 6 | 7 | 1 | 2 | 3 | ♯4 | ♯5 | 6 |

Also illustrated in FIG. 7 is the sequence for the G♯ neapolitan minor scale, which is represented by the sequence:

1, ♭2, ♭3, 4, 5, ♭6, 7, 1.

As can be seen, this corresponds to the notes G♯, A, B, C♯, D♯, E, G, G♯.

Apart from known scales, new scales may be invented by the user and the sequences of notes in any key rapidly determined using the apparatus described herein.

TABLE 2

Examples of Chord Formulas

| Chord | Formula (Numerals to play) |
|---|---|
| Major | 1, 3, 5 |
| Minor | 1, ♭3, 5 |
| Seventh | 1, 3, 5, ♭7 |
| Minor Seventh | 1, ♭3, 5, ♭7 |
| Sixth | 1, 3, 5, 6 |
| Minor Sixth | 1, ♭3, 5, 6 |
| Major Seventh | 1, 3, 5, 7 |

Other chords and scales, either known or invented, may also be readily determined using many embodiments of the apparatus.

Figure 8:
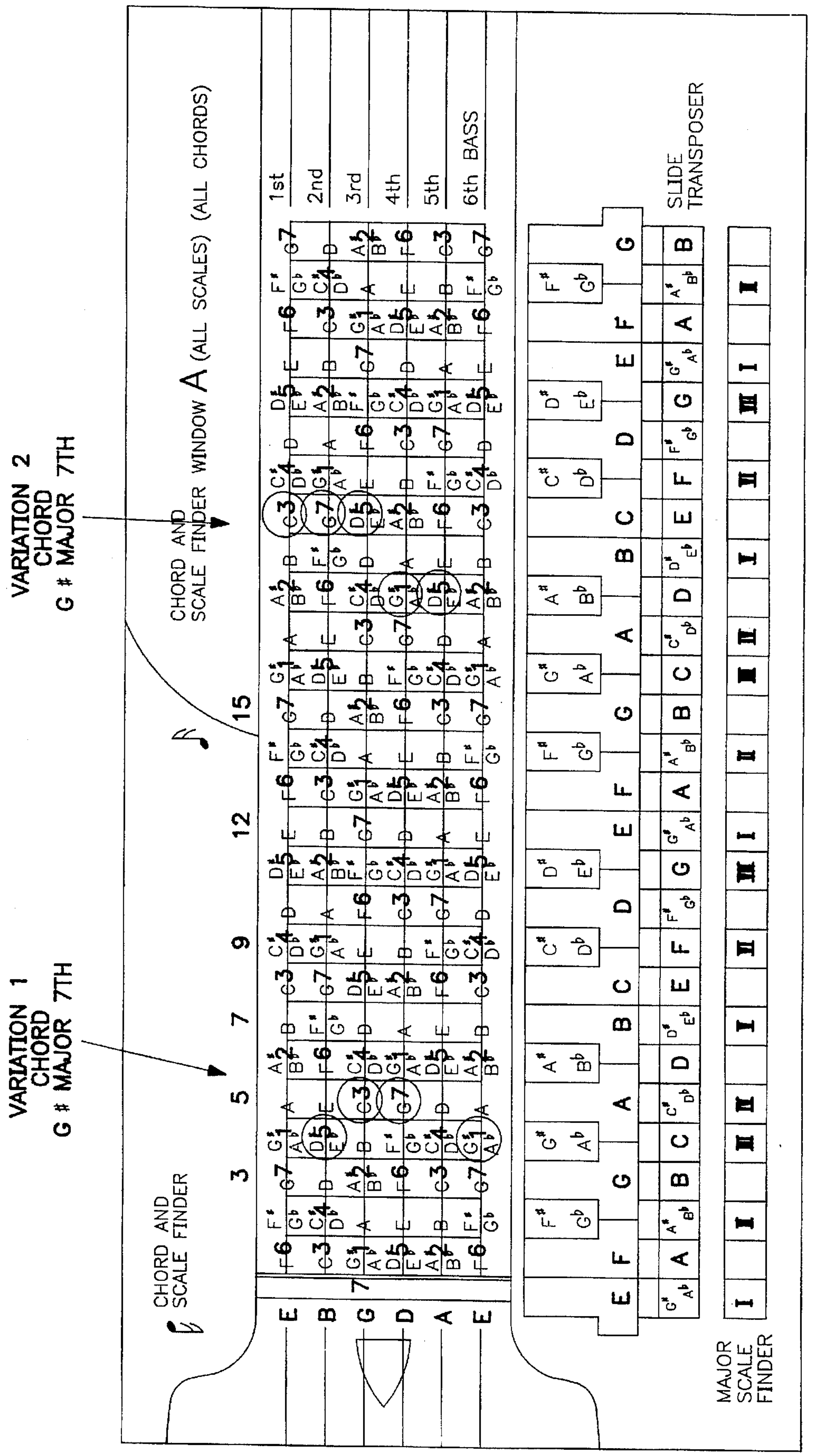
FIG. 8: is a plan view of apparatus based on the embodiments of FIGS. 1 and 2, illustrating the sequence for two different chords.

Apart from scales, the apparatus may also be used to determine chords, either recognised or invented. Table 2 illustrates some of the sequence for common recognised chords. The information provided by this table is used in the same manner as for Table 1, to indicate the appropriate notes belonging to the indicated chord in any key (for example, FIG. 8). As can be appreciated, other common recognised chords exist and may also be calculated using the apparatus of the present invention. Similarly, new invented chords can also be created and the notes belonging to that sequence readily determined.

Also provided on the illustrated embodiment of FIG. 1, is a key transposer. This comprises a set of areas 8 (FIG. 2) comprising in succession the standard musical notes. A similar sequence appears on the sleeve 2 though this has been represented in the form of a keyboard for ease of use for keyboard orientated musicians. In practice, the notes indicated on the areas 8 on the insert 3 represent the key that the music piece was originally in. This is then slid in relation to the sleeve so that it aligns with the musical note corresponding to the new key. For instance, if the key of C were to be transposed into the key of F, then the letter C on the insert would be aligned with the letter F on the sleeve 2. Each note read off the insert (3, 8) will align with its replacement (indicated on the sleeve 2) in the new key.

Also provided on the sleeve is a numerical sequence 9 which enables the notes of any key to be readily ascertained. For instance, if the notes in the scale of E are to be ascertained then the I in the sequence 9 is aligned with the letter E. II indicates the next note in the scale, III the third and so forth. As can be seen in FIG. 3, the scale of E comprises the sequence E F♯ G♯ A B C♯ D♯ E.

The present invention provides in a useful form, a computational device enabling many musical calculations to be readily performed. The physically movable nature of the apparatus allows different parameters to be readily converted and calculated and is also much easier to use and more compact than tables. One preferred embodiment has been shown by way of example only though it should be appreciated that the apparatus of the present invention may be constructed and represented in many other forms. In some ways it could be termed as a musical slide rule though it differs therefrom as the relationship of music or notes differ from the logarithmic relationships of a mathematical slide rule.

In addition, many embodiments can show the physical position for fingers on the fret of the guitar. Some embodiments may also be adapted to clip onto the neck of the guitar and be positioned adjacent the strings for ready reference by the musician, or may be positioned underneath the strings. This may involve the use of relatively thin materials which conform to the contours of the frets on the neck, or the use of moulded embodiments having raised portions corresponding to the frets. Such embodiments may require removal or lifting of the apparatus in order to slide the two portions, or may be required to be repositionable along the neck of the guitar. In some of these embodiments, the actual neck of the guitar could be seen to act as one of the portions and may include some alignment markings for the user.

Example 2

Figure 9:
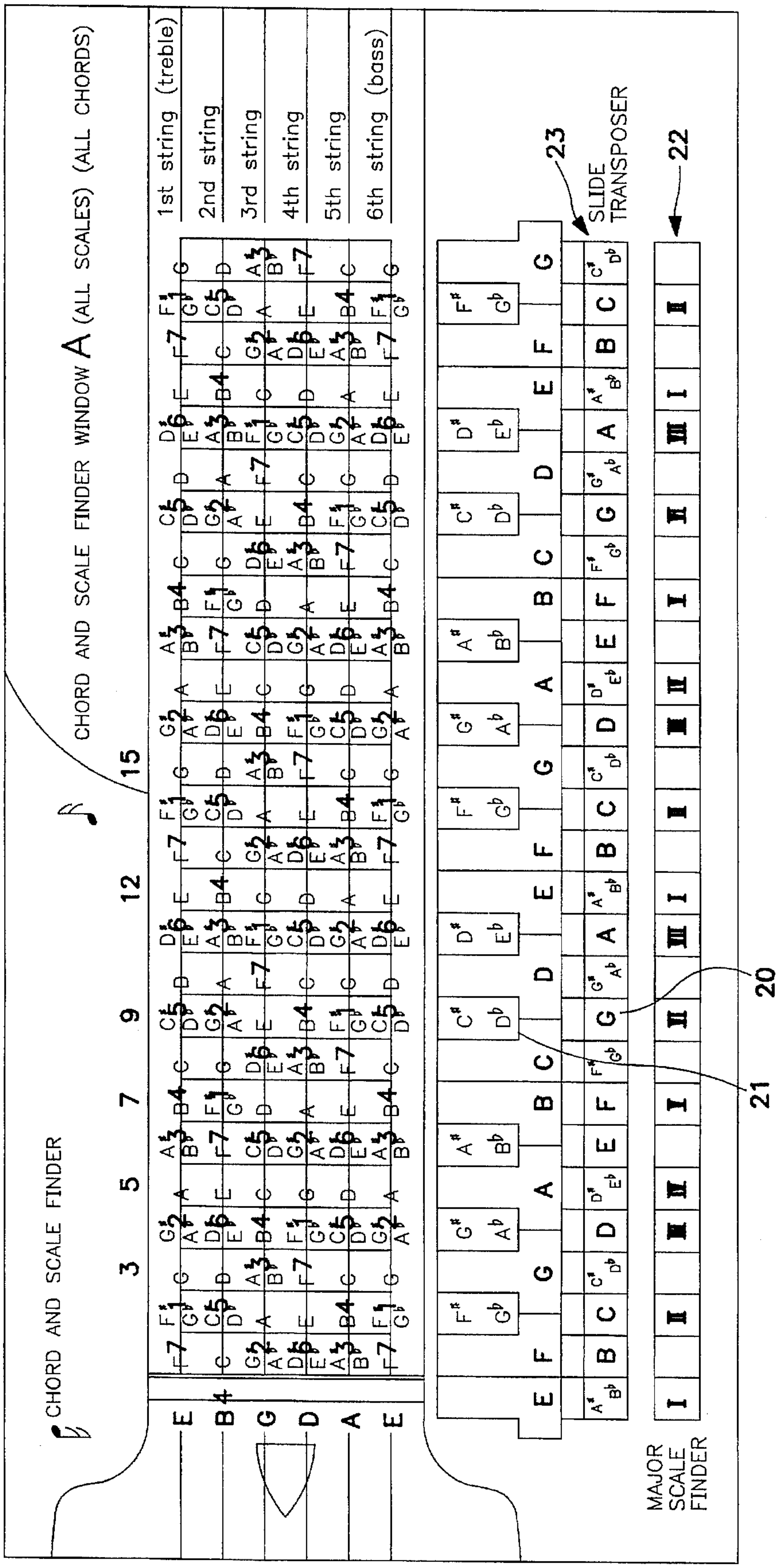
FIG. 9: is a plan view of apparatus based on the embodiments of FIGS. 1 and 2 in a position for transposing from the key of G to the key of C♯, or in the position for determining the major scale for the key of B♭.

FIG. 9 illustrates the position of the embodiment of FIGS. 1 and 2 for transposing music from the key of G to C♯. In the illustration, the letter G (20) of the internal sliding element is aligned with C♯ (21) on the overlying element. If the next note in the music to be translated were a B, then by correlating this with the appropriate segment on the overlaying scale indicates that the correct note would be F in the new scale of C♯. Similarly, D in the old scale would correlate to G♯/A♭ in the newly transposed scale. etc.

FIG. 9 also indicates the relative position of the elements for determining the major scale of A♯ or B♭. By following through the numerical sequence (generally indicated by arrow 22) the scale can be determined by correlating the notes (of the sequence generally indicated by arrow 23) to yield the scale, e.g.:

| | | | | | | | |
|---|---|---|---|---|---|---|---|
| B♭, | C, | D, | E♭, | F, | G, | A, | B♭ |
| I, | II, | III, | IV, | V, | VI, | VII, | I |

As can be seen in FIG. 9, information is presented in several forms including a numerical sequence, an alphabetical sequence of the musical notes, and a representation of a key board. Similarly other representations could be used, such as (for instance) the bass or treble register with the notes represented in the appropriate notational form. The fingering positions on the fret of a keyboard could also be employed. As can be appreciated there is a wide range of user choices available.

Example 3

Following are some further examples and tables relating to the use of various embodiments of the present invention. For convenience an embodiment similar to that illustrated will be referred to.

On the illustrated embodiment, some of musical notes have been substituted by numbers on the insert, the number 1 to 7. So the notes for example of the C Major scale are:

| | | | | | | | | |
|---|---|---|---|---|---|---|---|---|
| In music: | C | D | E | F | G | A | B | C |
| On the insert | 1 | 2 | 3 | 4 | 5 | 6 | 7 | 1 |

Just as with music notes in which there are sharps and flats, so may the representative numbers also have sharps and flats. However, so as not to clutter the slide rule window, the sharp and flat numbers are not printed—if you want to play a Flat 7 (♭7) or a sharp 6 (♯6) for example, it would lie between the numbers 6 and 7 etc.

TABLE 3

WINDOW P

MAJOR PENTATONIC - Pentatonic Major and Modes Generated by the Pentatonic Major Scale.

| | | | | | | |
|---|---|---|---|---|---|---|
| 1st MODE | 1 | 2 | 3 | 5 | 6 | 1 |
| 2nd MODE | 2 | 3 | 5 | 6 | 1 | 2 |
| 3rd MODE | 3 | 5 | 6 | 1 | 2 | 3 |
| 4th MODE | 5 | 6 | 1 | 2 | 3 | 5 |
| 5th MODE | 6 | 1 | 2 | 3 | 5 | 6 |

MINOR PENTATONIC - Pentatonic Minor and Modes generated by the Pentatonic Minor Scale.

| | | | | | | |
|---|---|---|---|---|---|---|
| 1st MODE | 6 | 1 | 2 | 3 | 5 | 6 |
| 2nd MODE | 1 | 2 | 3 | 5 | 6 | 1 |
| 3rd MODE | 2 | 3 | 5 | 6 | 1 | 2 |
| 4th MODE | 3 | 5 | 6 | 1 | 2 | 3 |
| 5th MODE | 5 | 6 | 1 | 2 | 3 | 5 |

BLUES SCALES - Just include the blue letter B marked on the insert of the slide rule for both Major and Minor Pentatonic Scales.

NOTE: Also experiement with added notes in your Pentatonic and Blues Scales such as cromatic runs.

SCALES AND MODES FORMULA CHART

Name Column 1 SCALE OR MODE — Number Column 1 NUMERIC FORMULAS — WINDOW A

MAJOR (Ionion Mode) - The Major Scale & Modes generated by the Major Scale

| | | | | | | | | | |
|---|---|---|---|---|---|---|---|---|---|
| MAJOR SCALE (Ionion Mode) | 1 | 2 | 3 | 4 | 5 | 6 | 7 | 1 | |
| DORIAN MODE | 2 | 3 | 4 | 5 | 6 | 7 | 1 | 2 | |
| PHRYGIAN MODE | 3 | 4 | 5 | 6 | 7 | 1 | 2 | 3 | |
| LYDIAN MODE | 4 | 5 | 6 | 7 | 1 | 2 | 3 | 4 | |
| MIXOLYDIAN MODE | 5 | 6 | 7 | 1 | 2 | 3 | 4 | 5 | |
| AEOLIAN MODE = | 6 | 7 | 1 | 2 | 3 | 4 | 5 | 6 | |
| (Natural Minor Scale) | (1 | 2 | ♭3 | 4 | 5 | ♭6 | ♭7 | 1) | Alternative numeric formula |
| LOCRIAN MODE | 7 | 1 | 2 | 3 | 4 | 5 | 6 | 7 | |

HARMONIC MINOR SCALE - The Harmonic Minor Scale & Modes generated by the Harmonic Minor Scale.

| | | | | | | | | |
|---|---|---|---|---|---|---|---|---|
| MODE 1 HARMONIC MINOR | 1 | 2 | ♭3 | 4 | 5 | ♭6 | 7 | 1 |
| MODE 2 | 2 | ♭3 | 4 | 5 | ♭6 | 7 | 1 | 2 |
| MODE 3 | ♭3 | 4 | 5 | ♭6 | 7 | 1 | 2 | ♭3 |
| MODE 4 | 4 | 5 | ♭6 | 7 | 1 | 2 | ♭3 | 4 |
| MODE 5 | 5 | ♭6 | 7 | 1 | 2 | ♭3 | 4 | 5 |
| MODE 6 | ♭6 | 7 | 1 | 2 | ♭3 | 4 | 5 | ♭6 |
| MODE 7 | 7 | 1 | 2 | ♭3 | 4 | 5 | ♭6 | 7 |

MELODIC MINOR - Melodic Minor Scale & Modes generated by the Ascending Melodic Minor Scale.

| | | | | | | | | | |
|---|---|---|---|---|---|---|---|---|---|
| MODE 1 Melodic Minor | 1 | 2 | ♭3 | 4 | 5 | 6 | 7 | 1 | Ascending |
| MODE 2 Donan ♭2 | 2 | ♭3 | 4 | 5 | 6 | 7 | 1 | 2 | |
| MODE 3 Lydian Augmented | ♭3 | 4 | 5 | 6 | 7 | 1 | 2 | ♭3 | |
| MODE 4 Lydian ♭7 | 4 | 5 | 6 | 7 | 1 | 2 | ♭3 | 4 | |

TABLE 3-continued

| | | | | | | | | |
|---|---|---|---|---|---|---|---|---|
| MODE 5 Mixolydian ♭6 | 5 | 6 | 7 | 1 | 2 | ♭3 | 4 | 5 |
| MODE 6 Locrian ♯2 | 6 | 7 | 1 | 2 | ♭3 | 4 | 5 | 6 |
| MODE 7 Super Locrian | 7 | 1 | 2 | ♭3 | 4 | 5 | 6 | 7 |

NOTE: When descending the natural minor scale is used.
JAZZ MINOR SCALE - Modes generated by the Jazz Minor scale are the same as the MELODIC MINOR SCALE both ascending and descending.

WINDOW A

| | | | | | | | | | |
|---|---|---|---|---|---|---|---|---|---|
| SPANISH 8 TONE SCALE | 1 | ♭2 | ♭3 | 3 | 4 | ♭5 | ♭6 | ♭7 | 1 |
| MONGOLIAN | 1 | 2 | 3 | 5 | 6 | 1 | | | |
| SPANISH SCALE | 1 | ♭2 | 3 | 4 | 5 | ♭6 | ♭7 | 1 | |
| BALINESE | 1 | ♭2 | ♭3 | 5 | ♭6 | 1 | | | |
| ORIENTAL SCALE | 1 | ♭2 | 3 | 4 | ♭5 | 6 | ♭7 | 1 | |
| EGYPTIAN | 1 | 2 | 4 | 5 | ♭7 | 1 | | | |
| DOUBLE HARMONIC SCALE | 1 | ♭2 | 3 | 4 | 5 | ♭6 | 7 | 1 | |
| HINDU SCALE | 1 | 2 | 3 | 4 | 5 | ♭6 | ♭7 | 1 | |
| MAJOR LOCRIAN | 1 | 2 | 3 | 4 | ♭5 | ♭6 | ♭7 | 1 | |
| JAPANESE | 1 | ♭2 | 4 | 5 | ♭6 | 1 | | | |
| HUNGARIAN GYPSY | 1 | 2 | ♭3 | ♯4 | 5 | ♭6 | ♭7 | 1 | |
| GYPSY | 1 | ♭2 | 3 | 4 | 5 | ♭6 | 7 | 1 | |

SCALES AND MODES

WINDOW M

| SCALE OR MODE | NUMERIC FORMULAS | | | | | | | | |
|---|---|---|---|---|---|---|---|---|---|
| NATURAL MINOR | 6 | 7 | 1 | 2 | 3 | 4 | 5 | 6 | |

MELODIC MINOR SCALE - Melodic Minor and Modes generated by the Ascending Melodic Minor Scale Minor

| | | | | | | | | | |
|---|---|---|---|---|---|---|---|---|---|
| MELODIC MINOR | 6 | 7 | 1 | 2 | 3 | ♯4 | ♯5 | 6 | * |
| MODE 1 | | | | | | M | M | | |
| DORIAN ♭2 | 7 | 1 | 2 | 3 | ♯4 | ♯5 | 6 | 7 | |
| 2nd MODE | | | | | M | M | | | |
| LYDIAN AUGUMENTED | 1 | 2 | 3 | ♯4 | ♯5 | 6 | 7 | 1 | |
| 3rd MODE | | | | M | M | | | | |
| LYDIAN ♭7 | 2 | 3 | ♯4 | ♯5 | 6 | 7 | 1 | 2 | |
| 4th MODE | | | M | M | | | | | |
| MIXOLYDIAN ♭6 | 3 | ♯4 | ♯5 | 6 | 7 | 1 | 2 | 3 | |
| 5th MODE | | M | M | | | | | | |
| LOCRIAN ♯2 | ♯4 | ♯5 | 6 | 7 | 1 | 2 | 3 | ♯4 | |
| 6th MODE | M | M | | | | | | M | |
| SUPER LOCRIAN | ♯5 | 6 | 7 | 1 | 2 | 3 | ♯4 | ♯5 | |
| 7th MODE | M | | | | | | M | M | |

Jazz Minor Scale is the same as the Melodic Minor both Ascending and Descending.
*You will notice that for ease of quick reference the letter M is used for Melodic Minor and the letter H is used for Harmonic Minor Scales.

WINDOW M

COMBINED MELODIC MINOR - the Melodic Minor Scale is used for ascending and the Natural Minor Scale for descending.

Natural

| | | | | | | | | | |
|---|---|---|---|---|---|---|---|---|---|
| MELODIC MINOR | 6 | 7 | 1 | 2 | 3 | ♯4 | ♯5 | 6 | Ascending |
| MODE 1 | | | | | | M | M | | |
| NATURAL MINOR | 6 | 7 | 1 | 2 | 3 | 4 | 5 | 6 | Descending |
| MODE 1 | | | | | | | | | |
| DORIAN ♭2 | 7 | 1 | 2 | 3 | ♯4 | ♯5 | 6 | 7 | Ascending |
| 2nd MODE | | | | | M | M | | | |
| NATURAL MINOR 2nd MODE | 7 | 1 | 2 | 3 | 4 | 5 | 6 | 7 | Descending |
| LYDIAN AUGUMENTED | 1 | 2 | 3 | ♯4 | ♯5 | 6 | 7 | 1 | Ascending |
| 3rd MODE | | | | M | M | | | | |
| NATURAL MINOR 3th MODE | 1 | 2 | 3 | 4 | 5 | 6 | 7 | 1 | Descending |
| LYDIAN ♭7 | 2 | 3 | ♯4 | ♯5 | 6 | 7 | 1 | 2 | Ascending |
| 4th MODE | | | M | M | | | | | |
| NATURAL MINOR 4th MODE | 2 | 3 | 4 | 5 | 6 | 7 | 1 | 2 | Descending |
| MIXOLYDIAN ♭6 | 3 | ♯4 | ♯5 | 6 | 7 | 1 | 2 | 3 | Ascending |
| 5th MODE | | M | M | | | | | | |
| NATURAL MINOR 5th MODE | 3 | 4 | 5 | 6 | 7 | 1 | 2 | 3 | Descending |

TABLE 3-continued

| | | | | | | | | | |
|---|---|---|---|---|---|---|---|---|---|
| LORIAN ♭2 | ♭4 | ♭5 | 6 | 7 | 1 | 2 | 3 | ♭4 | Ascending |
| 6th MODE | M | M | | | | | | M | |
| NATURAL MIN 6th MODE | 4 | 5 | 6 | 7 | 1 | 2 | 3 | 4 | Descending |
| SUPER LOCRIAN | ♭5 | 6 | 7 | 1 | 2 | 3 | ♭4 | ♭5 | Ascending |
| 7th MODE | M | | | | | | M | M | |
| NATURAL MINOR 7th MODE | 5 | 6 | 7 | 1 | 2 | 3 | 4 | 5 | Descending |
| HARMONIC MINOR - Harmonic Minor and Modes Generated by the Harmonic Minor Scale. | | | | | | | | | |
| 1st MODE | 6 | 7 | 1 | 2 | 3 | 4 | ♭5 H | 6 | |
| 2nd MODE | 7 | 1 | 2 | 3 | 4 | ♭5 H | 6 | 7 | |
| 3rd MODE | 1 | 2 | 3 | 4 | ♭5 H | 6 | 7 | 1 | |
| 4th MODE | 2 | 3 | 4 | ♭5 H | 6 | 7 | 1 | 2 | |
| 5th MODE | 3 | 4 | ♭5 H | 6 | 7 | 1 | 2 | 3 | |
| 6th MODE | 4 | ♭5 H | 6 | 7 | 1 | 2 | 3 | 4 | |
| 7th MODE | ♭5 H | 6 | 7 | 1 | 2 | 3 | 4 | ♭5 H | |

WINDOW P

| | | | | | | |
|---|---|---|---|---|---|---|
| MAJOR PENTATONIC - Pentatonic Major and Modes Generated by the Pentatonic Major Scale. | | | | | | |
| 1st MODE | 1 | 2 | 3 | 5 | 6 | 1 |
| 2nd MODE | 2 | 3 | 5 | 6 | 1 | 2 |
| 3rd MODE | 3 | 5 | 6 | 1 | 2 | 3 |
| 4th MODE | 5 | 6 | 1 | 2 | 3 | 5 |
| 5th MODE | 6 | 1 | 2 | 3 | 5 | 6 |
| MINOR PENTATONIC - Pentatonic Minor and Modes generated by the Pentatonic Minor Scale. | | | | | | |
| 1st MODE | 6 | 1 | 2 | 3 | 5 | 6 |
| 2nd MODE | 1 | 2 | 3 | 5 | 6 | 1 |
| 3rd MODE | 2 | 3 | 5 | 6 | 1 | 2 |
| 4th MODE | 3 | 5 | 6 | 1 | 2 | 3 |
| 5th MODE | 5 | 6 | 1 | 2 | 3 | 5 |

BLUES SCALES - Just include the blue letter B marked on the insert of the slide rule for both Major and Minor Pentatonic Scales.
NOTE: Also experiement with added notes in your Pentatonic and Blues Scales such as cromatic runs.

Regarding chord combinations, only the numbers 1 to 7 are printed on the insert of the illustrated embodiment. If for example you wish to find a C11 chord, the chord formula for C11 is as follows, printed below:

| | | | | | | |
|---|---|---|---|---|---|---|
| = | 1 | 3 | 5 | 7 | 9 | 11 |

The numbers you would use on the slide rule are:

| | | | | | | |
|---|---|---|---|---|---|---|
| = | 1 | 3 | 5 | 7 | 2 | 4 |

Because 2≅9 (i.e., 9–7=2) and 4≅11 (i.e., 11–7=4) (see also section on chords)

Scales and Modes

On the Scales and Mode Table (see Table 3), there are two columns. The first column shows the names of the scales and modes. The second column shows a series of numbers beside each of the names.

Figure 10:
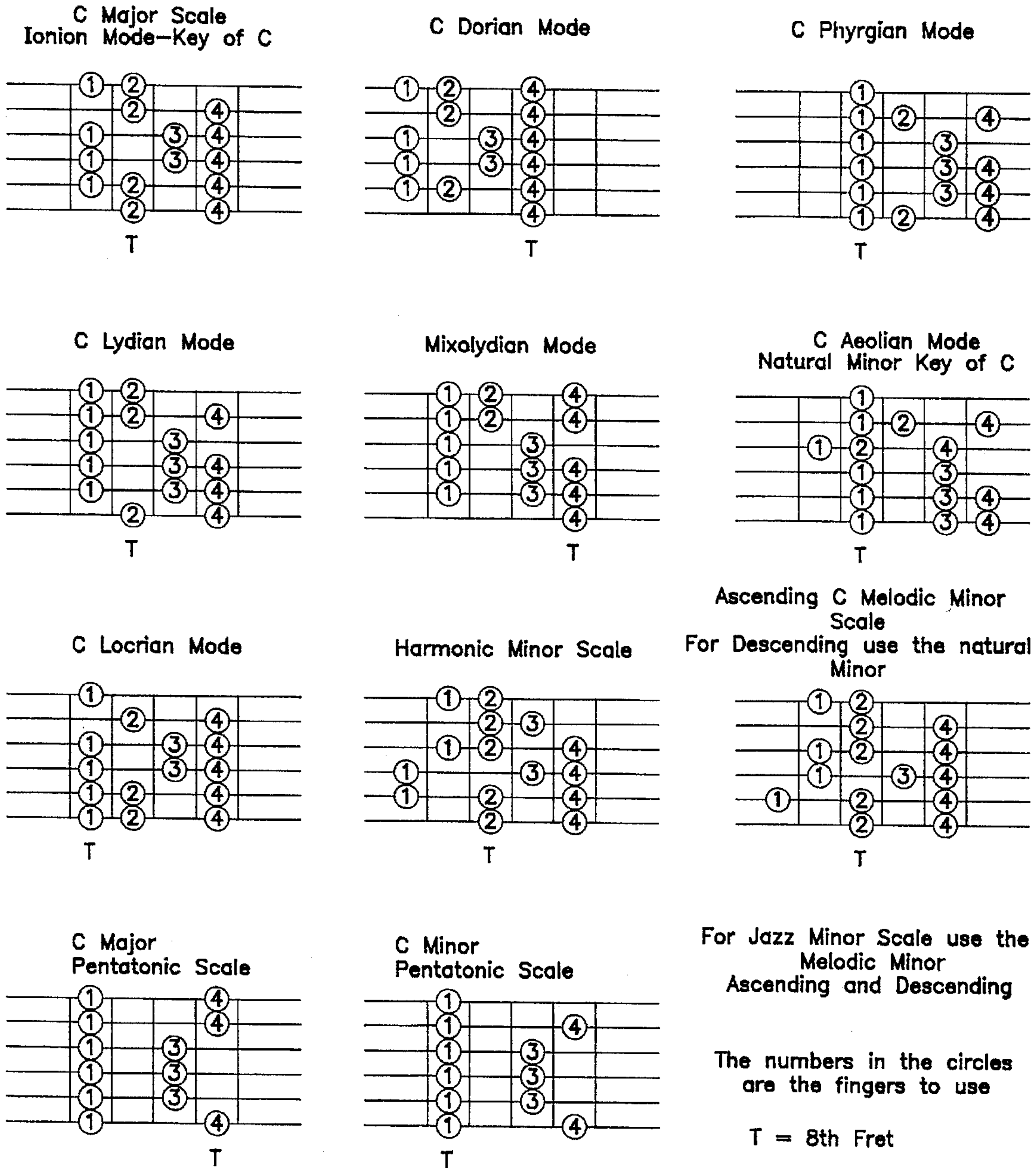
FIG. 10: is an illustration of some scale and mode patterns with reference to the embodiments of FIGS. 1 and 2, and FIG. 11–16: illustrate fret positions for some chord variations (with reference to the embodiments of FIGS. 1 and 2.
Figure 11:
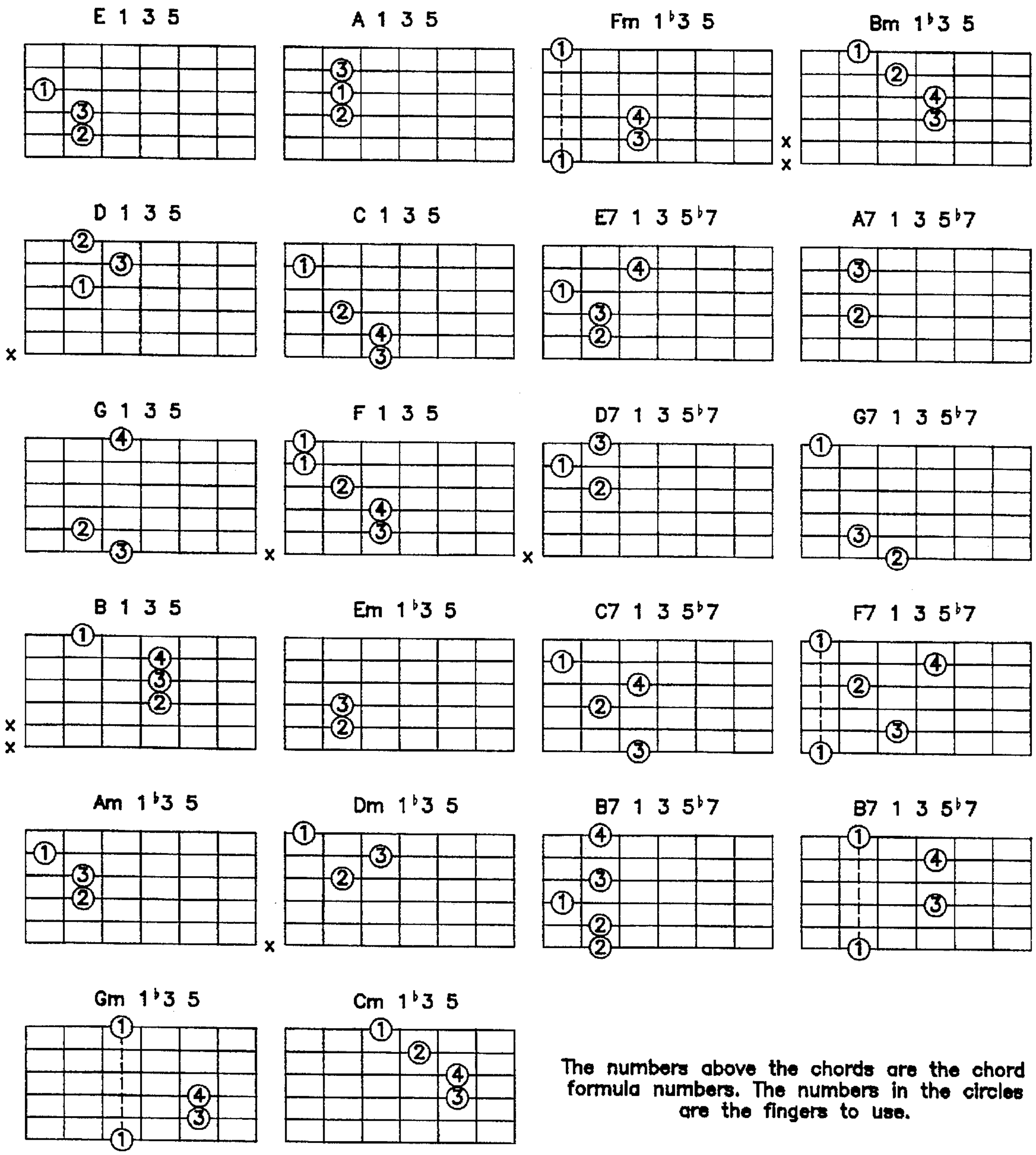
Figure 12:
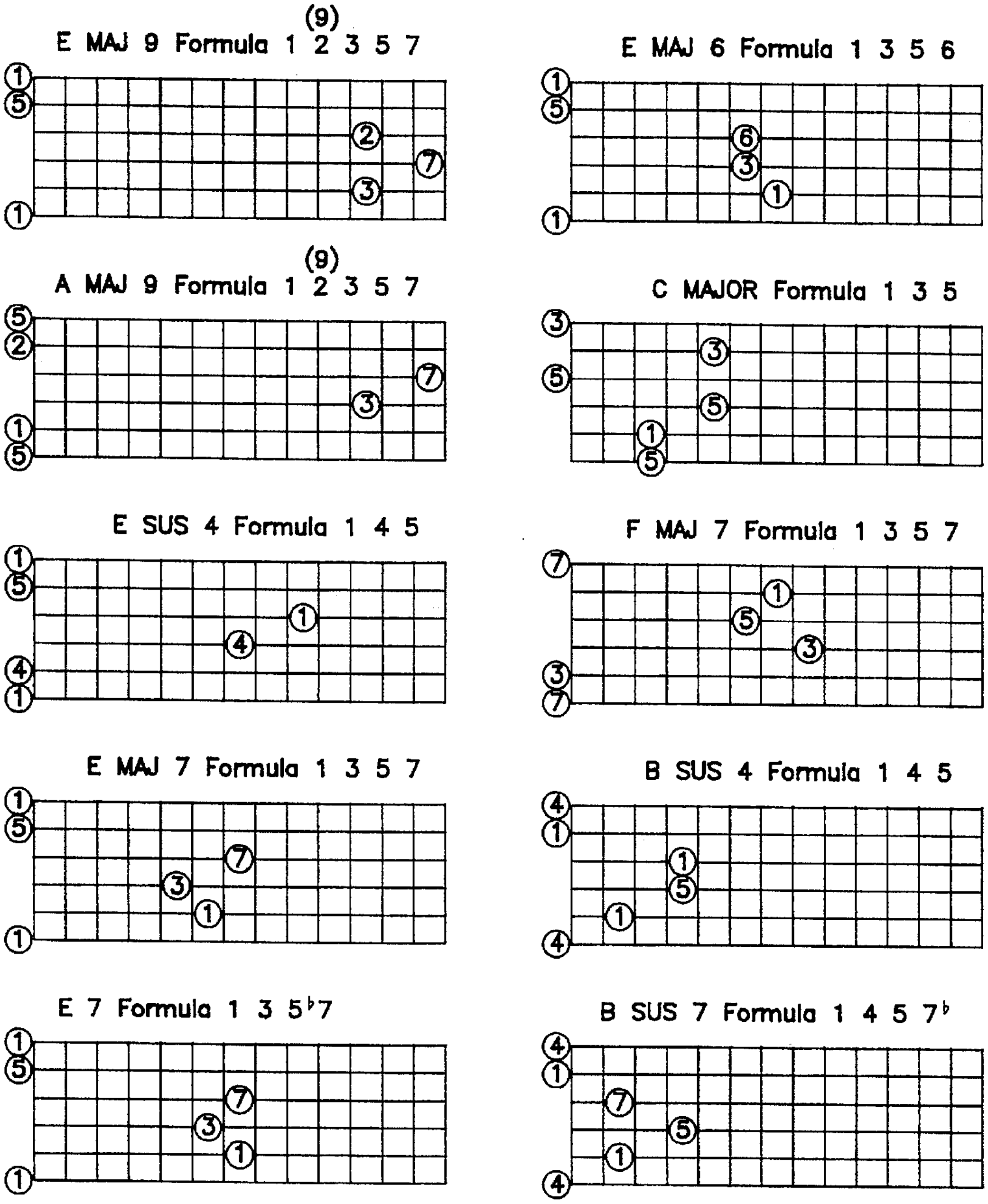
Figure 13:
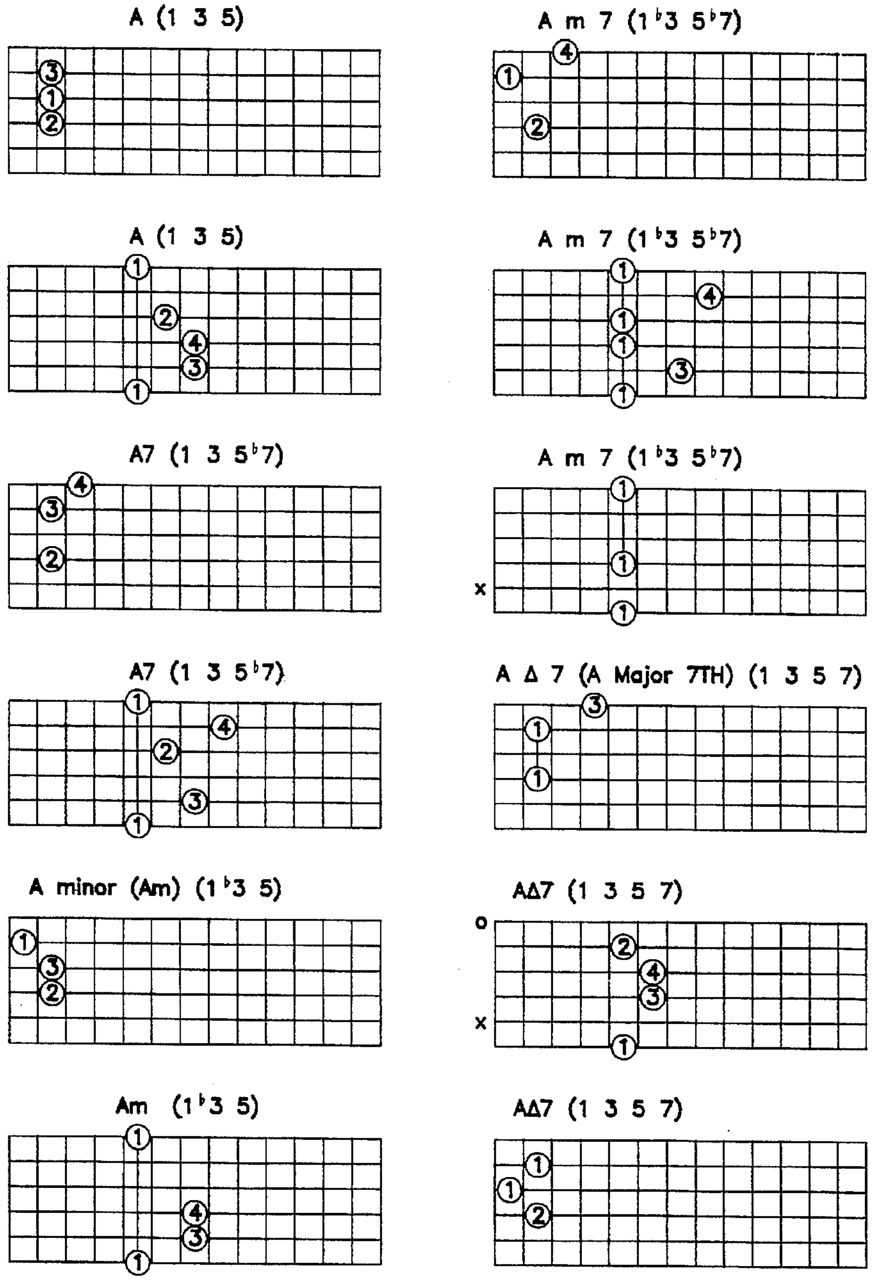
Figure 14:
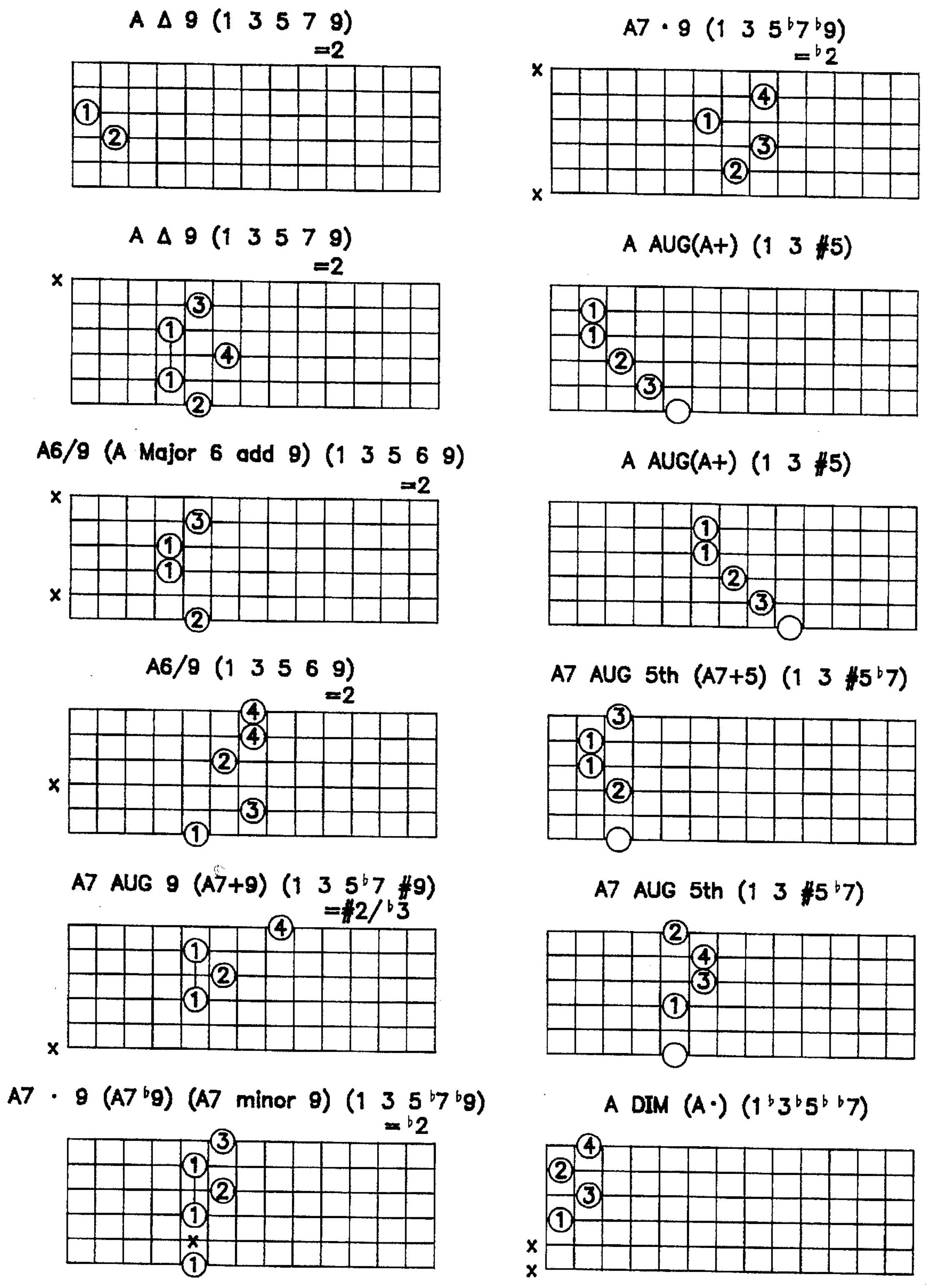
Figure 15:
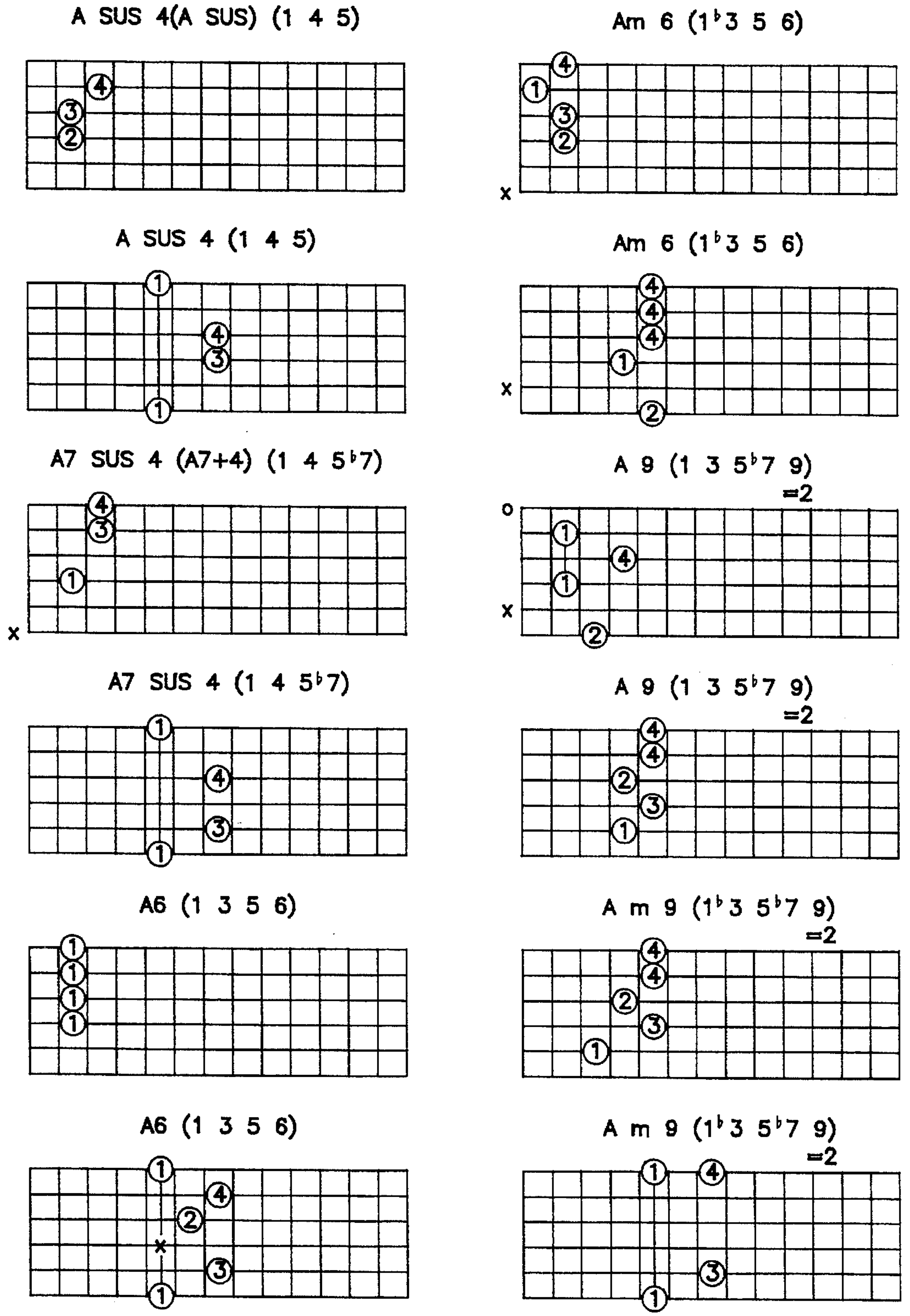
Figure 16:
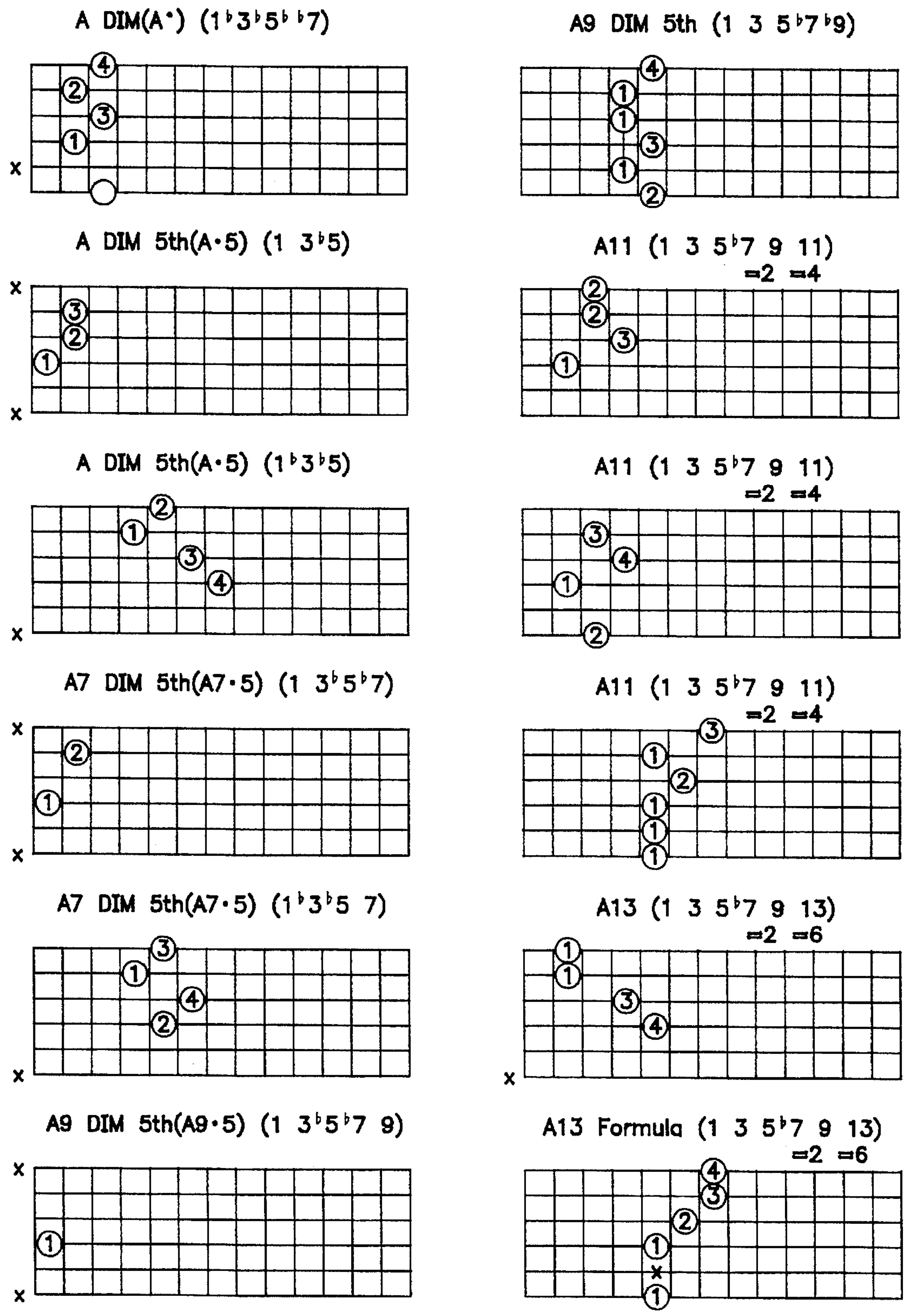

To play any scale or mode, slide the insert so the first number that is shown (in the second column next to the name of the scale or mode you want to play) appears immediately on the right and beside the note you wish to start from (that is printed on the sleeve). FIG. 10 shows some common scale and mode patterns and their fingering.

Example No. 3a

To Play the C Major Scale

1. Refer to the scales and mode chart, marked for window A. On the chart you will see in the name column—Major Scale (which is also known as the ionian mode). This is followed by the numbers 1, 2, 3, 4, 5, 6, 7, 1 in the second numbers column.
2. Now as the first number shown is the number '1', slide the insert until all the numbers '1' appear next to the notes marked C on the front window of the sleeve (window A).
3. All the numbers shown in window A will now correspond with the notes as shown below:

| | | | | | | | | | |
|---|---|---|---|---|---|---|---|---|---|
| Numbers | 1 | 2 | 3 | 4 | 5 | 6 | 7 | 1 | etc. |
| Notes | C | D | E | F | G | A | B | C | etc. |

These numbers shown above, show the notes of the C Major scale you can play in every possible position on the neck of the Guitar, ascending or descending.

4. If you play the numbers shown above in consecutive order, starting on the number one and ending on another number one, you will be playing the C Major scale.

Special Note

Before we continue with our Example No. 3a please take note that if you wished to play any other Major Scale such as D Major scale, just slide the insert so the numbers '1' appear beside all the notes marked on D on this sleeve and apply all the procedures for Example 1. The numbers 1, 2, 3, 4, 5, 6, 7, 1 show the notes of the D Major scale.

| | | | | | | | | | | |
|---|---|---|---|---|---|---|---|---|---|---|
| e.g. | Numbers | 1 | 2 | 3 | 4 | 5 | 6 | 7 | 1 | etc. |
| | Notes | D | E | F♯ | G | A | B | C♯ | D | etc. |

It will be obvious now that there are a variety of different ways, patterns or directions we can use to play the major scale.

Now back to our Example 1. Key and Scale of C Major

5. For creating solo improvisations in the key of C Major, you can play any of the numbers shown, in or out of sequence, starting on any number, and ending on any number so as to create solo improvisations, lead runs, arpeggios, scale runs, triads, finger tapping and playing harmony runs such as two third notes together.

Example No. 3b

To play the C Phrygian Mode
(which is the 3rd mode of the A♭ Major scale)

1. Refer to the scales and modes chart, for window A.
2. Look for the name "Phrygian Mode".
3. Find the first number shown for the formula in the second column, immediately on the right, opposite the name "Phrygian Mode". The first number shown is No. 3.
4. Slide the insert so that all the numbers 3 appear immediately on the right of and beside all the notes of C, shown on the sleeve.
5. Now the numbers shown for the "Phrygian Mode" on the scales and modes chart are 3, 4, 5, 6, 7, 1, 2, 3 so if you start playing on the Number 3 in consecutive order you will be playing:

| | | | | | | | | |
|---|---|---|---|---|---|---|---|---|
| Numbers | 3 | 4 | 5 | 6 | 7 | 1 | 2 | 3 |
| Notes | C | Df | E♭ | F | G | A♭ | B♭ | C |

which are notes of the C Phrygian Mode.

6. As in Example No. 1 you are free to experiment with the C Phrygian Mode, by playing the No's. 3, 4, 5, 6, 7, 1, 2, 3 in order starting at any position on the neck of the guitar ascending or descending.
7. For creating solo improvisations, etc., in C Phrygian, you can play any of the No's, shown in or out of sequence, starting on any number, and ending on any number, so as to create solo improvisations, lead runs, riffs, arpeggios, Harmony runs, Finger tapping, etc.

Example No. 3c

To play the E Aeolian Mode
(E Aeolian is also known as E Natural minor. Em is the Relative minor for G Major).

1. Refer to the scale and modes chart. Window A.
2. Look for the name "Aeolian Mode".
3. The first number shown in the formula column of the Aeolian Mode is the No. 6.
4. Now slide the insert so that all the No's. 6 on the insert are next to all the notes marked E on the sleeve in Window A.
5. The formula for the Aeolian Mode shown on the scales and modes chart are 6, 7, 1, 2, 3, 4, 5, 6 so if you play the numbers in consecutive order you will be playing

| | | | | | | | | |
|---|---|---|---|---|---|---|---|---|
| Numbers | 6 | 7 | 1 | 2 | 3 | 4 | 5 | 6 |
| Notes | E | F♯ | G | A | B | C | D | E |

which are the notes of the E Aeolian Mode.

6. As in the previous examples you are now free to experiment with the E Aeolian Mode in any position on the neck of the Guitar ascending or descending.
7. You can create solo improvisation, etc., by playing the numbers shown in or out of sequence and starting on any number, etc. Just use your ear, imagination and have lots of fun.

Note: The Aeolian Mode is also known as the natural minor scale. So you will find two numbered formula's on the scales and modes chart for window A as shown below.

| | | | | | | | | |
|---|---|---|---|---|---|---|---|---|
| Aeolian Mode | 6 | 7 | 1 | 2 | 3 | 4 | 5 | 6 |
| Natural Minor Scale | 1 | 2 | 3 | ♭4 | 5 | 6 | ♭7 | ♭1 |

Both formulas will give the same notes. The 6th note of any Major Scale is called the relative minor.

All scales, modes, and chords, may be found using Window A on the sleeve of the slide rule. However for easy focus on minor scales, pentatonics, blues scales and their modes, on the reverse of the slide rule, windows P and M have been created. Use the scale and mode chart formulas for windows P and M, if using the reverse side of the slide rule.

Melodic Minor Scale—Window M or A

1. The melodic minor scale is usually played ascending (going up in pitch). When descending (coming back down in pitch) the notes of the Natural Minor scale are used.

Jazz Minor Scale

2. If the notes of the Melodic Minor Scale are used both ascending and descending, this is known as the Jazz Minor scale. So the numbered formula for the Melodic Minor and combined Melodic and Natural Minor scales are shown on the scale and modes chart.

To play any of the scales or modes shown on the scales and modes chart do the same as with Examples 1, 2 or 3 previously given.

A. Find the name of the Scale or Mode you wish to play and look for the 1st number of the formula shown on the chart.
B. Slide the insert so the first number shown, appears beside and immediately on the right of the note you wish to start form.
C. Then just play the numbers shown.

How to Play the Modes of Other Scales

A lot of scales are shown on the scales and modes chart. If you wish to experiment with some of the modes of these scales you simply start on another of the numbers shown. For example, the formula for the Neapolitan Major Scale is: 1, ♭2, ♭3, 4, 5, 6, 7, 1

If you want to play the C Neapolitan Major Scale you slide the insert so the number '1' is on the note of C and you have

| | | | | | | | | | |
|---|---|---|---|---|---|---|---|---|---|
| Numbers | 1 | 2 | ♭3 | ♭4 | 5 | 6 | 7 | 1 | etc. |
| Notes | C | D | E♭ | F♭ | G | A | B | C | etc. |

Now if you were to slide the insert so the number ♭2 (the second number of the scale) was on the C note, you would then have the numbers of the second mode of the Neapolitan Major Scale in C, which are:

| | | | | | | | | |
|---|---|---|---|---|---|---|---|---|
| Numbers | ♭2 | ♭3 | 4 | 5 | 6 | 7 | 1 | ♭2 |
| Notes | C | D | E | F♯ | G♯ | A♯ | B | C |

Now if you had the third number of the Neapolitan Major scale, which is ♭3 on the note of C, this would now be the 3rd mode in C. Start the number four on the note of C and you have the 4th Mode, etc.

This scale has seven possible modes as do a lot of other scales. So now you can experiment with modes of other scales.

If you have a scale that is not on the scales and modes chart, or you create a scale of your own you wish to remember and experiment with, write down the notes, for example:

Notes of scale are A, B♭, C, Df, E♭, F, G, A.

1. As the note of A is the first note of the scale, slide the insert so the number 1 is the note of A. Now all you do is plot out the numbers of the notes and we have a formula.

| | | | | | | | | | |
|---|---|---|---|---|---|---|---|---|---|
| Notes | A | B♭ | C | D♭ | D | E♭ | F | G | A |
| Numbers | 1 | ♭2 | ♭3 | 3 | 4 | ♭5 | ♭6 | ♭7 | 1 |

Now you can experiment with this scale and it's modes in any key anywhere on the neck of the guitar using the above formula. This scale, by the way, is actually the Spanish 8 tone scale.

Chords

1. Chords are made up from formulas relating to the major scale from which the chord is named. Take the C Major scale for an example:

| | | | | | | | |
|---|---|---|---|---|---|---|---|
| I | II | III | IV | V | VI | VII | I |
| C | D | E | F | G | A | B | C |

The chord of C Major uses the 1st, 3rd and 5th notes of the C Major scale.

| | | | |
|---|---|---|---|
| Notes of C Major Chord | C | E | G |
| Numbered formula | 1 | 3 | 5 |

The chord of C Minor uses the 1st flat, 3rd and 5th notes of the C Major scale.

| | | | |
|---|---|---|---|
| Notes of C Minor Chord | C | E♭ | G |
| Numbered formula | 1 | ♭3 | 5 |

A list of chords and formulas are given on the chord formula chart. By adding more notes from the scale you can create other numerous chords. For example, if you add the seventh note to the C Major chord you get a C Major 7th chord.

| | | | | | | | |
|---|---|---|---|---|---|---|---|
| = | C | E | G | B | D | = | C Major 9th |
| | 1 | 3 | 5 | 7 | 9 | | |

Now we see that although the Major scale only has seven notes you can continue to count up to thirteen as this is like adding on notes an octave higher—the 2nd note of a Major scales could also be called the 9th note.

| | | | | | | | | | | |
|---|---|---|---|---|---|---|---|---|---|---|
| e.g. | I | II | III | IV | V | VI | VII | VIII | = | (I)IX = II etc. |
| | C | D | E | F | G | A | B | C | | D |

You will see that on the insert for the slide rule the numbers are from 1 to 7 and no higher so as not to clutter the insert with unnecessary numbers. So when looking for chord formulas remember that:

| | | |
|---|---|---|
| The number 2 | could be the equivalent of the | 9th note of the scale |
| The number ♭2 | could be the equivalent of the | ♭9th note of the scale |
| The number ♯2 | could be the equivalent of the | ♯9th note of the scale |
| The number 4 | could be the equivalent of the | 11th note of the scale |
| The number 6 | could be the equivalent of the | 13th note of the scale |

To be able to find and play chords using the slide rule:

1. Refer to the chord formula chart. Beside the names and symbols of each chord is a series of numbers similar to the scales and modes of formulas.
2. By following the same procedures for scales and modes you can find chords.

Example 3d

To find the C Major Chord

The formula for a Major Chord is 1, 3, 5. Slide the insert so the numbers 1 are next to the C notes on window A of the sleeve. Now by playing the numbers 1, 3, 5 in any order, combination, or position on the neck of the guitar you have the chord of C Major. With chord formulas, you can double up on some of the numbers. For C Major=1, 3, 5 you could have three number '1', two number '5', and one number '3' using up all six strings of the guitar for the chord. Or you could use just one number '1', one number '5', and one number '3' using only three strings of the guitar for your chord, creating what is called a triad.

You should have at least one of each of the formula numbers in your chord. There are of course exceptions to this rule, such as: a chord that has so many formula numbers that you just don't have enough strings to play them all at once as a chord; a chord that may be just too awkward to play. Generally the first note is omitted and the chord is referred to as a 'non root chord'.

For some examples and ideas refer to the chord chart of 'Interesting Sounding Chords'.

How to Find and Know What Chords Can Be Used With Any Scale

Note: We will need to refer to

1. The chord formula chart (see Table 4)

2. The major scale in all 12 keys chart.

For our example we will use the C Major scale but remember this theory can be applied to any scale. Chords are made up from a formula relating to the "Major Scale" from which the chord is named. When using a certain scale we combine the notes of that scale to create chords that may be used for that particular scale. This process is generally referred to as harmonising the scale, because we are combining different notes of the scale with each other which creates harmony, giving us our chords.

| | | | | | | | | |
|---|---|---|---|---|---|---|---|---|
| To use the C Major | I | II | III | IV | V | VI | VII | I |
| Scale | C | D | E | F | G | A | B | C |
| Numbers on the slide rule insert | 1 | 2 | 3 | 4 | 5 | 6 | 7 | 1 |

By combining the notes of the scale above we now get a combination of a variety of chords that originate out of the scale. Generally the notes are combined in thirds. So lets start with the 1st—C, 3rd—E, and 5th—G note of the scale. Now we have a chord. So now unless you already know your chord formulas refer to the chord formula chart and you see that the formula 1 3 5=Major Chord. So the first chord we have constructed from the first note of the C Major Scale is the chord of C Major. Now if we want we could add another note from the scale chord of C Major. The next note we could add is a third away from the G note. So we now add the seventh note which is B. Now we have the chord formula for a Major 7th chord.

| | | | | | |
|---|---|---|---|---|---|
| 1 | 3 | 5 | 7 | = | C Major 7th Chord |
| C | E | G | B | | |

Now if we added another note a third away from the note of B which is the ninth note the note D. We find another chord we can also use as a first chord in the key of C Major.

| | | | | | | |
|---|---|---|---|---|---|---|
| 1 | 3 | 5 | 7 | 9* | = | C Major Chord |
| C | E | G | B | D | | |

(*Remember the 9th note is the same as the the 2dn note in the Scale.)

TABLE 4

CHORD SYMBOLS AND FORMULA CHART

| CHORD | CHORD SYMBOLS | FORMULA |
|---|---|---|
| MAJOR | MAJ. M. | 135 |
| MINOR | min. m. — | 1♭35 |
| SEVENTH | 7 | 135♭7 |
| MINOR SEVENTH | min 7 −7 | 1♭35♭7 |
| MINOR SEVEN FLAT 5 (Half Diminished) | m7 ♭5 | 1♭3 ♭5♭7 |
| SIXTH | 6 Δ6 M6 | 1♭356 |
| MINOR SIXTH | m6 | 1♭356 |
| MAJOR 7TH | M7 Δ7 7 | 1357 |
| AUGMENTED | AUG + +5 #5. | 13#5 |
| DIMINISHED SEVEN | DIM. O7 DIM 7th | 1 ♭3 ♭5 ♭♭7 |
| DIMINISHED | DIM | 1 ♭3 ♭5 |
| MAJOR FLAT 5 | ♭5 DIM5th | 13♭5 |
| SEVENTH AUG 5TH | 7#5. 7+5. 7+. | 13#5♭7 |
| SEVENTH FLAT 5 | 7♭5. 7−5. 7 DIM 5th. | 13♭5♭7 |
| SEVEN SHARP 5 FLAT NINE | 7#5♭9 7+5−9 | 13#5 ♭7 ♭2 |
| NINTH | 9 | 135♭7 2 |
| MAJOR 9TH | Δ9 M9 0 | 135 7 2 |
| MAJOR ADD 9 | ADD 9 | 1352 |
| MINOR 9TH | m9 | 1♭35♭7 2 |

TABLE 4-continued

CHORD SYMBOLS AND FORMULA CHART

| CHORD | CHORD SYMBOLS | FORMULA |
|---|---|---|
| SUSPENDED 4TH | SUS 4 SUS. | 145 |
| SEVEN SUSPENDED | 7 SUS 4 | 145♭7 |
| NINTH AUG 5TH | 9#5 | 13#5♭7 2 |
| SEVEN FLAT NINE FLAT 5 | 7♭9♭5 | 13♭5♭7 ♭2 |
| SIX ADD 9 | MAJ6 ADD 9 6(9). 6/9 | 13562 |
| MINOR 6/9 | m6 ADD9 m6/9 | 1♭3562 |
| MINOR MAJOR SEVENTH | mM7 | 1♭357 |
| SEVEN SHARP 9 | 7#9. 7+9. 7 AUG 9th | 135♭7#2 |
| SEVEN FLAT 9 | 7 min 9 7 −9 | 135♭7♭2 |
| NINE FLAT 5 | 9♭5. | 13♭5♭72 |
| ELEVENTH | 11 | 135♭72 4 |
| THIRTEENTH | 13 | 135♭7 2 4 6 |
| THIRTEEN FLAT 9 | 13♭9 | 135♭7 ♭2 4 6 |
| THIRTEEN♭5 ♭9 | 13♭5♭9 | 13♭5♭7♭2 4 6 |
| MINOR THIRTEEN | m13 | 1♭35♭7♭2 4 6 |

The Diminished seven chord is often substituted for the diminished chord triad 1 ♭3 ♭5

We could create different combinations still to create more chords. For example, combine the 1st, 3rd, 5th and also the 6th note and we have

| | | | | | |
|---|---|---|---|---|---|
| 1 | 3 | 5 | 6 | = | C Major 6th Chord |
| C | E | G | A | | |

or combine the 1st, 4th and 5th notes and we have

| | | | | |
|---|---|---|---|---|
| 1 | 4 | 5 | = | C sus. 4 Chord |
| C | F | G | | |

Now after having harmonised some of the notes starting from the first note of C, we have these chords that we may use so far.

1. C Major
2. C Major 7
3. C Major 9
4. C Major 6
5. C sus. 4

There are still other combinations that we could find.

Now lets build some chords from the second note of the C Major Scale the Note D. By adding in thirds to start with, we get our first chord from the 2nd note of the scale.

| | | |
|---|---|---|
| II | IV | VI |
| D | F | A |

Remember these notes are from the C Major scale so to find out what chord it actually is we need to compare the notes D F A to the D Major scale.

To do this you may either use the "Major Scale in all twelve keys chart" or the Major Scale finder on the slide rule. By sliding the insert so the D note is above the Roman numeral I, the Roman numerals show the D Major scale as seen below.

| I | II | III | IV | V | VI | VII | I |
|---|---|---|---|---|---|---|---|
| D | E | F♯ | G | A | B | C♯ | D |

Now compare the notes D F A that come from the C Major scale with the D Major scale as shown below to see what chord the notes D F A make.

| | I | II | III | IV | V | VI | VII | | I |
|---|---|---|---|---|---|---|---|---|---|
| D Major Scale | D | E | F♯ | G | A | B | C♯ | | D |
| Notes from the C Major Scale | D | | F | | A | | | | |
| Chord Formula | 1 | | $\flat$3 | | 5 | = | D minor chord | | |

Now by harmonising the notes of the C Major scale from the second note of D, we now have a D Minor chord.

You can continue to add more notes to create other chords as we did with the C note. But remember as the note we are starting with now is the D note when you have your notes together such as D F A C you compare them to the scale of D to find out what chord it is D F A C is the 1st, $\flat$3rd, 5th and $\flat$7th notes of the D Major Scale and this formula is:

| | | | | | |
|---|---|---|---|---|---|
| D | F | A | C | = | D minor 7th chord |
| 1 | $\flat$3 | 5 | $\flat$7 | | |

Remember when you start harmonising the C Major scale from the third note, the note of E, you get, for example E G B. Now compare those notes to the scale of E Major to find out what chord formula it is so you know what chord it creates.

| | | | | | |
|---|---|---|---|---|---|
| e.g. | E | G | B | = | E minor chord |
| | 1 | $\flat$3 | 5 | | |

By now it will be obvious that we can construct chords from our scale starting from each individual notes of the scale.

Scales & Modes Over Chord Progressions

| C Major Scale (Ionian Mode) | | | | | | | | |
|---|---|---|---|---|---|---|---|---|
| | I | II | III | IV | V | VI | VII | I |
| Numbers shown on insert | 1 | 2 | 3 | 4 | 5 | 6 | 7 | 1 |
| Notes of C Major scale | C | D | E | F | G | A | B° | C |

Here are some chords that may be used for creating chord progressions in the key of C Major.

| I | II | III | IV | V | VI | VII | I |
|---|---|---|---|---|---|---|---|
| C | Dm | Em | F | G | Am | B° | C |
| C Mj7 | Dm7 | Em7 | FMj7 | G7 | Am7 | Bm7$\flat$5 | CMj7 |

| Example 1 | Chord Progression in Key of C | | |
|---|---|---|---|
| I Major | II Minor | V Major | I Major |
| C/// | Dm/// | G/// | C/// |

Now if you record on tape, the above chord progression repeated a few times, or have someone play it for you, you can now play the notes of the C Major Scale and experiment with the notes, in a variety of ways in any position on the neck of the guitar, to create solo ideas and improvisations.

So by using window A on the sleeve of the slide rule and by sliding the insert so the number 1 is next to the note of C we now have the formula:

| | | | | | | | | |
|---|---|---|---|---|---|---|---|---|
| Number shown on insert etc: all over the neck. | 1 | 2 | 3 | 4 | 5 | 6 | 7 | 1 |
| Notes of the C Major Scale shown on the sleeve etc: all over the neck. | C | D | E | F | G | A | B | C |

We now have the notes of the C Major Scale at a glance, shown by the numbers, all over the neck of the guitar, and now we may experiment at improvising a solo, using a combination of the numbers shown. Embodiments which allow the apparatus to be attached to the neck of the guitar or instrument may be helpful. Some embodiments may slip behind the strings while some may clip to the neck in alignment with the actual frets.

Now experiment with a different chord progression such as:

| | | | |
|---|---|---|---|
| C MAJ 7/// | F MAJ 7/// | Dm7/// | G/// |

or create your own progression from any of the chords of the C Major Scale.

Now say for example we will start with the second note in the Key of C which is the note D. We could use a D minor or D minor 7th chord to start our progression, and for our second chord in the progression we could use the first note in the key of C to find our next chord which could be a C Major chord or C Maj 7 chord.

Now we will use the fifth note from the key of C which is the note of G, and our third chord could be a G chord or G7 chord.

As we are playing, a progression starting with the second note or chord, of the C Major scale as our tonic sound, we are playing in a mode, the mode of D Dorian.

| Example 2 | Chord Progression in D Dorian Mode | | |
|---|---|---|---|
| Dm/// | C/// | G/// | Dm/// |

Now if we play the C Major scale over this chord progression, but placing emphasis on the second note of the C Major scale the note of D, and perhaps by starting a solo run on the note of D, we can improvise all over the neck of the guitar to create solo's of our choice. Experiment, always use your ear and have lots of fun.

As in Example 1 the slide is set so the number 1 shown on the insert is on the note of C on the sleeve. Now the numeric formula for Dorian mode is:

| | | | | | | | | |
|---|---|---|---|---|---|---|---|---|
| Formula for Dorian Mode | 2 | 3 | 4 | 5 | 6 | 7 | 1 | 2 |
| Notes of D Dorian | D | E | F | G | A | B | C | D |

If you start the solo on the number 2 first, it will stress the sound of the second note of the C Major scale as we are now playing a chord progression in D Dorian mode.

You can see and hear that D Dorian mode is really the C Major scale in a sense, except our chord progression is played around the sound of the D note and chord of Dm.

So although the notes and chords come from the C Major scale, we are not using C note or chord of that scale. You are playing in Major or Ionian mode. If you play a chord progression based on the second note or chord of that scale you are playing in it's second mode, the Dorian mode in this case.

It is possible to start or create a chord progression based on any of the notes of the scale as the tonic sound, and these create what is called the modes, depending on which note you start creating a progression from, depending on if its the second mode, third mode, or fourth mode, etc.

Below is a diagram of the names of the modes starting on each note of the C Major scale.

| | I | II | III | IV | V | VI | VII |
|---|---|---|---|---|---|---|---|
| | C | D | E | F | G | A | B |
| Name of | (Major) | Dorian | Phrygian | Lydian | Mixolydian | Aeolian | Locrian |
| Mode | Ionian | Mode | Mode | Mode | Mode | Mode | Mode |
| Modes | 1st Mode | 2nd Mode | 3rd Mode | 4th Mode | 5th Mode | 6th Mode | 7th Mode |

Generally all scales have modes that may be used. But of course they won't be all practical or sound good.

Generally the Major scale, Harmonic minor, Melodic minor and Jazz minor scales have modes that are used—not necessarily all their modes, but some of them.

When the notes of any scale are harmonised they help to show some of the chords that may be used with that scale and their modes.

Below is a list of some of the more common scales that have been harmonised to show some of the chords that may be used with those scales.

HARMONISED C MAJOR SCALE

| C | D | E | F | G | A | B |
|---|---|---|---|---|---|---|
| I | II | III | IV | V | VI | VII |
| Major | Minor | Minor | Major | Major | Minor | Diminished |
| Major 7 | Minor 7 | Minor 7 | Major 7 | Dom 7th | Minor 7 | m7♭5 |

HARMONISED HARMONIC MINOR SCALE

| C | D | E♭ | F | G | A♭ | B |
|---|---|---|---|---|---|---|
| I | II | III | IV | V | VI | VII |
| Major | Dim | Aug | Minor | Major | Minor | Diminished |
| m/M7 | Half Dim | M7♯5 | min7 | Dom7 | maj7 | Dim7 |

HARMONISED C MELODIC MINOR SCALE

| C | D | E♭ | F | G | A♭ | B |
|---|---|---|---|---|---|---|
| I | II | III | IV | V | VI | VII |
| minor | minor | Aug | Major | Major | Dim | Dim |
| m/M7 | m7 | M7♯5 | Dom7th | Dom7th | m7♭5 | m7♭5 |

HARMONISED C MIXOLYDIAN MODE (also referred to as the dominant 7th scale)

| C | D | E | F | G | A | B♭ |
|---|---|---|---|---|---|---|
| I | II | III | IV | V | VI | VII |
| Maj | minor | Dim | Major | minor | minor | Major |
| Dom 7th | m7th | M7♭5 | M7 | minor 7 | m7 | M7 |

Please note: That as seen above, chord names may be written in a variety of ways, such as Minor 7♭5 may abbreviated to m7♭5. Refer to Chord Symbol Formula chart.

Naming Chords

There is a particular chord you play or have discovered, but you are not sure of what it is called, this is how you can find out.

1. Draw the shape of the chord eg.

X=strings not played

O=note held down by fingers

No's=the no's in the circles are the fingers to use

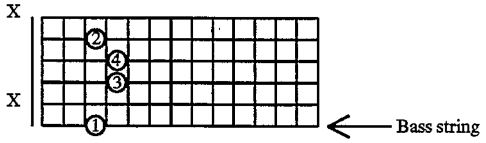

2. Using window A of the sleeve, slide the insert so the number 1 appears on one of the notes of the chord your playing.
3. Then write down the numbers corresponding to the notes of your chord, and you will have a chord formula.
4. If the formula does not make much sense then move the insert so the number 1 appears on another of the notes of the chord and see if the numbers showing for all the notes of the chord make sense now.
5. If not then do the same again, move the number 1 to another note and try again.

6. Eventually you should be able to create a proper chord formula and find the name of this chord.
7. The formula for the example show is 1 3 5 7 the number 1 is on the note of G. The number 3 is on the note of B. The number 5 is on the note of D and the number 7 is on the note of F♯/G♭ so now we end up with:

| | | | | |
|---|---|---|---|---|
| Notes | G | B | D | F♯/G♭ |
| Chord Formula | 1 | 3 | 5 | 7 |
| | = | | G Maj7 Chord | |

Unless you are already familiar with your chord formulas, you may need to refer to the chord formula chart.

Finger Tapping

The slide rule can be useful for developing creative ideas for tapping. Decide what scale you wish to experiment with, and set the slide to that scale. Then simply by holding down any note you want to start on with your chord hand, tap out a combination of the scale notes shown above the note being held down.

Transposing

If you have a chord progression for a song and want to change the key, use the slide transposer section of the slide rule.

| Example: | Chord Progression in the Key of C | | | |
|---|---|---|---|---|
| II: | CMaj7/// I | Dmin7/// I | G/// I | G/// :II |
| II: | FMaj7/// I | Fmin7/// I | G/// I | G/// :II |

Now we want to change this progression from the Key of C to the Key of F.

1. Slide the insert so the note of C (on the insert) is directly underneath the letter (note) of F which is marked on the keyboard diagram.
2. So now the first chord of C Maj 7 in the old key now becomes the chord of F Maj 7 in the new key.
3. Now the 2nd chord in the old key is D min 7. You will see that above the letter E is the letter G on the keyboard diagram so the chord of Dmin 7 in the old key now becomes the chord of Gmin 7 in the new key.
4. The same procedure also applies for chords. You can change the tonic name of the chord in the old key, to the tonic name shown above in the new key.
5. So, for instance, the above chord progression in the key of C now becomes:

| | | | | |
|---|---|---|---|---|
| II: | FMaj7/// I | Gmin7/// I | C/// I | C/// :II |
| II: | B♭Maj7/// I | B♭min7/// I | C/// I | C/// :II |

Chords That Have More Than One Name

Some chords will have more than one name as the notes of the chord are the same, but depending on the note named as the Tonic, will depend on the name the chord is given.

Below is an analysis of one chord that has two names.

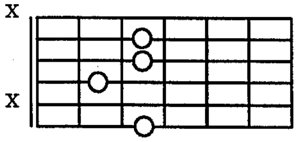

G min 6
or
E min 7♭5

The formula and notes for this chord with G as the Tonic are:

| | | | | |
|---|---|---|---|---|
| Notes of Chord | G | B♭ | D | E |
| Formula numbers | I | ♭3 | 5 | 6 |

The number 1 on the insert will be on the note of G on the sleeve.

And with E as the Tonic:

| | | | | | | |
|---|---|---|---|---|---|---|
| Notes of Chord | E | G | B♭ | D | = | Em7♭5 |
| Formula numbers | I | ♭3 | ♭5 | ♭7 | | |

The number 1 on the insert will be the note of E on the sleeve. As you can see the notes are the same.

Keyboard/Piano

The slide rule may also be used for finding scales, modes or chords in any key on a keyboard. The procedure is the same as for finding this information for guitar, but instead of looking at the numbers all over the neck of the strings we only refer to the numbers on the bottom line (bass string) directly above the keyboard diagram.

If you compare the notes of the 6th base string E with the keys below on the keyboard diagram, you will notice that the notes above and below are the same.

For example, to find the C Major Scale:

Slide the insert so the number 1 on the bottom line is directly above the note of C on the keyboard diagram.

Now all the numbers on the bottom line are above the notes of the keys you play for the C Major Scale.

| | | | | | | | | |
|---|---|---|---|---|---|---|---|---|
| C | D | E | F | G | A | B | C | scale |
| 1 | 3 | 5 | = | C | E | G | | chord |

So now you can see in our example above that the slide rule is set for the Scale of C and you can find the scale either on the guitar or also on the piano. If you want to find C Dorian mode slide the insert so the number '2' is above the key of C on the keyboard diagram and you will notice that all the numbers '2' are also next to the notes of C on the guitar as well. So now you can find the C Dorian mode on the guitar or keyboard.

Aspects of the present invention have been described by way of example only and it should be appreciated that modifications and additions may be made thereto without departing from the scope thereof as defined in the appended claims.

I claim:

1. Apparatus comprising a first element and a second element whose position relative to each other can be altered, and in which a portion of both said elements is visible during use of the apparatus, said first clement comprising a visual representation of a keyboard and an associated window portion allowing keyboard associated information on said second clement to be visible, and a visual representation of a stringed instrument's fret, as said associated window portion allowing frets of a fingerboard of a stringed instrument fret associated information on said second element to be visible, and information identifying the relative position of different musical notes on said representation of said stringed instrument's fingerboard fret;

said second element comprising:

said fret associated information comprising at least one indicated sequence corresponding to either or both a musical scale or chord, this fret associated information in conjunction with said visual representation of said stringed instrument's fingerboard fret on said first element indicating relative finger positioning for said stringed instrument's fingerboard fret, and said keyboard associated information in turn comprising an accepted notation for said musical notes, the keyboard associated information being alignable with the visual representation of said keyboard on said first element thereby allowing said represented notes to be correlated with said notes of the visual representation of said keyboard for key transposition;

and wherein either or both:

i) the positioning of the visual keyboard representation on the first element is such that the position of the musical notes represented by the keyboard correlate to the positioning of the indicated musical notes on at least one of the strings of the visual representation of the frets, and ii) on said second element, the position of a sequence of said fret associated information representing said scale, correlates in position to a sequence of musical notes on said keyboard associated information belonging to said scale.

2. The apparatus as claimed in claim 1 wherein a said indicated scale, chord or sequence comprises at least one of a preferred group of keys comprising: a major key, a minor key, and including the Dorian, phrygian, lydian, mixolydian, aeolian, and locrian modes, and including melodic, harmonised, pentatonic and diminished variations.

3. The apparatus as claimed in claim 1 wherein said indicated sequence of the fret associated information on the second element comprises at least one of the following forms of representation: a numerical sequence (including Roman and Arabic notations), an alphabetic sequence, and said sequence of musical notes.

4. The apparatus as claimed in claim 1 wherein said accepted notation for said musical notes of the keyboard associated information of the second element comprises either or both a stave representation of said musical notes, and alphabetic identification of the said musical notes.

5. The apparatus as claimed in claim 1 which includes at least one additional element, movable with respect to said first and second elements, which includes at least one of said indicated sequence, or a member of said group of musical representations.

6. The apparatus as claimed in claim 1 wherein said first and second elements slide linearly with respect to each other and at least one said visible portion of different said elements may be positioned side by side adjacently with respect to each other.

7. The apparatus as claimed in claim 1 wherein said first element fully or partially overlays the second element, and wherein portions of an overlaid element exhibiting information (comprising at least one of said indicated sequence or a member of said group of musical representations) remain visible during use.

8. The apparatus as claimed in claim 7 wherein said information is visible through windows in said first element.

9. The apparatus as claimed in claim 1 wherein said information (comprising at least one of an indicated sequence corresponding to either or both of said musical scale or chord, or said musical notes represented in an accepted notation) are visible on two faces of at least one element.

10. The apparatus as claimed in claim 9 wherein said elements having said information on two faces is reversible with respect to the other said elements.

11. The apparatus as claimed in claim 1 wherein a plurality of said indicated sequences are provided on the apparatus which indicate a plurality of said scales or chords on said fret, said scales or chords being of the same key though on different strings, octaves, or combinations thereof.

12. The apparatus as claimed in claim 1 which includes means for attachment to the neck of a guitar-like instrument.

13. The apparatus as claimed in claim 1 in the form of a linear or rotary slide rule.

14. The apparatus as claimed in claim 1 wherein either said first element or second element comprises a sleeve and another element comprises an insert slidable therein.

* * * * *